(12) United States Patent
Tsukahara et al.

(10) Patent No.: US 6,249,496 B1
(45) Date of Patent: Jun. 19, 2001

(54) OPTICAL STORAGE APPARATUS

(75) Inventors: Wataru Tsukahara; Shigenori Yanagi; Toru Ikeda, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/196,098

(22) Filed: Nov. 19, 1998

(30) Foreign Application Priority Data

May 21, 1998 (JP) .................................................. 10-139972

(51) Int. Cl.⁷ .................................................. G11B 7/09
(52) U.S. Cl. .................................. 369/44.28; 369/44.34; 369/44.29; 369/44.35
(58) Field of Search ............................. 369/44.27, 44.28, 369/44.29, 44.32, 44.35, 44.11, 58, 54, 44.25, 44.26, 44.34, 47

(56) References Cited

U.S. PATENT DOCUMENTS 5,311,490  *  5/1994  Matoba et al. ..................... 369/44.28

FOREIGN PATENT DOCUMENTS

| 62-12929 | 1/1987 | (JP) . |
| 63-10382 | 1/1988 | (JP) . |
| 63-4431 | 1/1988 | (JP) . |
| 133778 | 2/1989 | (JP) . |
| 135787 | 2/1989 | (JP) . |
| 1260634 | 10/1989 | (JP) . |
| 4216330 | 8/1992 | (JP) . |
| 4248137 | 9/1992 | (JP) . |
| 589491 | 4/1993 | (JP) . |
| 554392 | 5/1993 | (JP) . |
| 5325234 | 12/1993 | (JP) . |
| 6036307 | 2/1994 | (JP) . |
| 6068488 | 3/1994 | (JP) . |
| 6168471 | 6/1994 | (JP) . |
| 6232690 | 8/1994 | (JP) . |
| 6349079 | 12/1994 | (JP) . |
| 9035283 | 2/1997 | (JP) . |
| 9081948 | 3/1997 | (JP) . |
| 9251721 | 9/1997 | (JP) . |

* cited by examiner

Primary Examiner—Muhammad Edun
(74) Attorney, Agent, or Firm—Greer, Burns & Crain, Ltd.

(57) ABSTRACT

A correction processing unit for correcting a level fluctuation appearing on a tracking error signal when a laser beam passes an ID area on a medium track during an on-track control is provided. That is, in the correction processing unit, a correction value determined by a correction value determining unit at a correction timing detected by a correction timing discriminating unit is subtracted by a correcting unit from a signal value obtained by sampling and converting the tracking error signal into digital data by an A/D converter at a predetermined period and reading, thereby performing the correction.

13 Claims, 32 Drawing Sheets

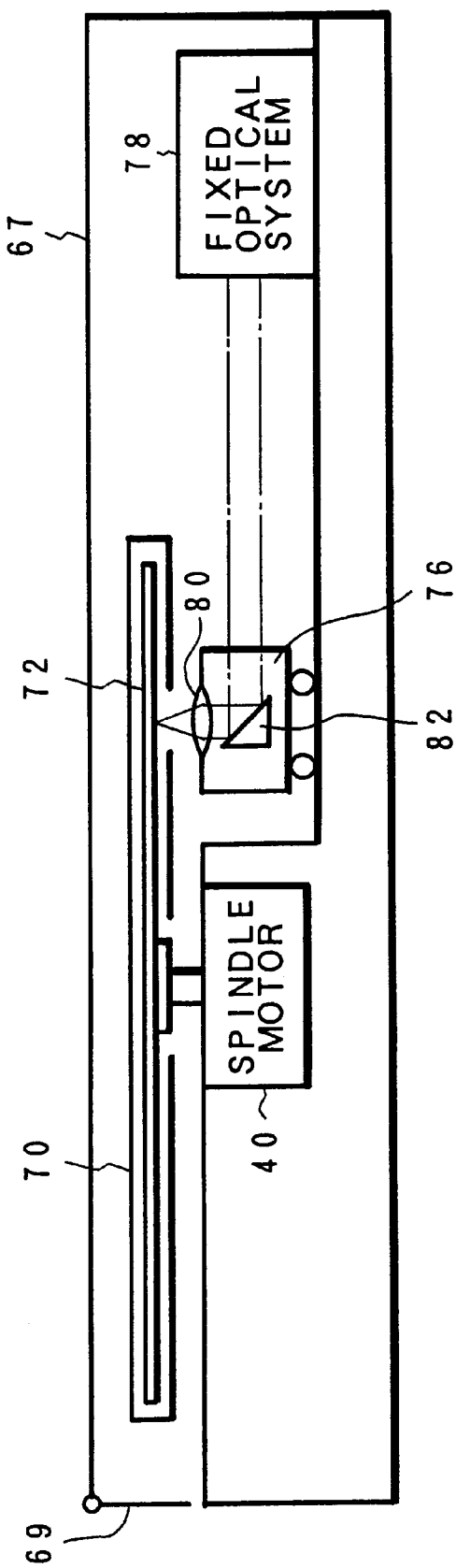

FIG. 4

| CONTROL MODE | SWITCH CONTROL STATE | | | | | |
|---|---|---|---|---|---|---|
| | SW118 | SW106 | SW156 | SW186 | SW178 |
| TRACK OFF | 0 | 0 | 1 | 0 | 0 |
| TRACK ON | 0 | 1 | 0 | 1 | 0 |
| FINE SEEK | 1 | 0 | 0 | 1 | 1 |
| POSITION SEEK | 0 | 0 | 1 | 0 | 1 |

F I G. 5

| CONTROL MODE | CONTROL CONTENTS |
|---|---|
| TRACK OFF | THE FOCUSING SERVO IS TURNED ON AND THE LENS ACTUATOR IS CONTROLLED TO THE ZERO POSITION BY THE LENS POSITION SIGNAL. |
| TRACK ON | THE FOCUSING SERVO IS TURNED ON AND THE LENS ACTUATOR IS ON-TRACK CONTROLLED BY THE TRACKING ERROR SIGNAL. |
| FINE SEEK | THE FOCUSING SERVO IS TURNED ON. THE LENS ACTUATOR IS SPEED CONTROLLED. THE VCM IS FEED-FORWARD CONTROLLED. THE VCM IS CONTROLLED TO THE LENS ZERO POSITION BY THE LENS POSITION SIGNAL (DOUBLE SERVO). |
| POSITION SEEK | THE FOCUSING SERVO IS TURNED ON. THE LENS ACTUATOR IS CONTROLLED TO THE ZERO POSITION BY THE LENS POSITION SIGNAL. THE PICKUP IS POSITION CONTROLLED TO THE TARGET BY THE VCM. |

TES SIGNAL
(OUTPUT OF AMPLIFIER 88)

TES SIGNAL E1
(OUTPUT OF LPF 90)

MOXID SIGNAL E4

TES DATA
(ADC READ VALUE)

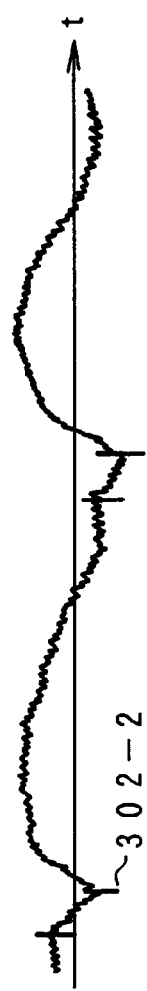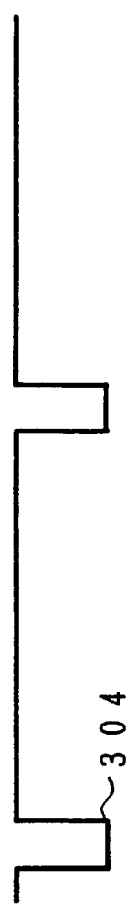
FIG. 7A TES SIGNAL (OUTPUT OF AMPLIFIER 88)
FIG. 7B TES SIGNAL E1 (OUTPUT OF LPF 90)
FIG. 7C MOXID SIGNAL E4
FIG. 7D TES DATA (ADC READ VALUE)

TES SIGNAL E1

MOXID SIGNAL E4

TES DATA (ADC READ VALUE)

CORRECTION VALUE

CORRECTION OUTPUT VALUE

F I G. 10
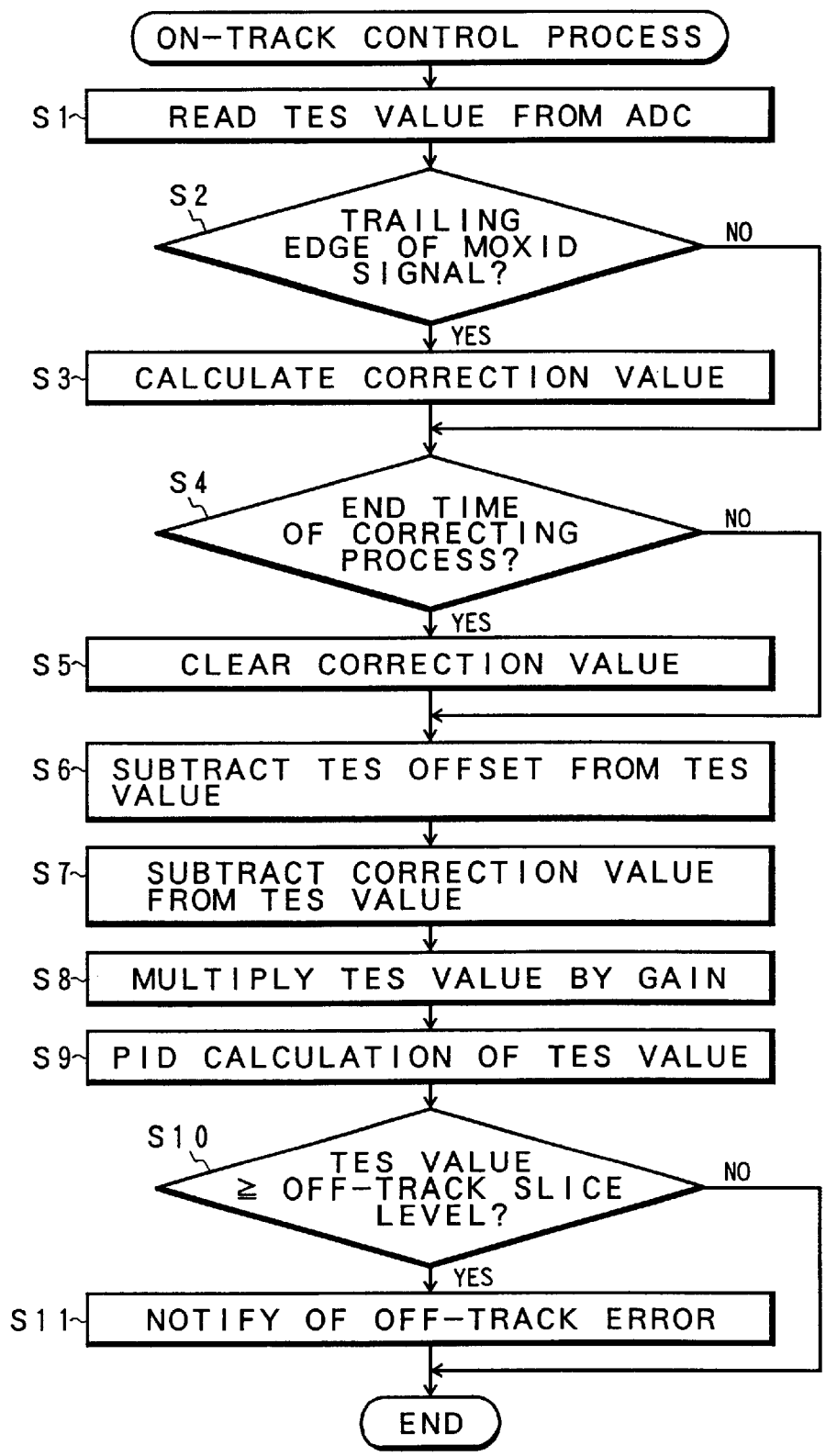

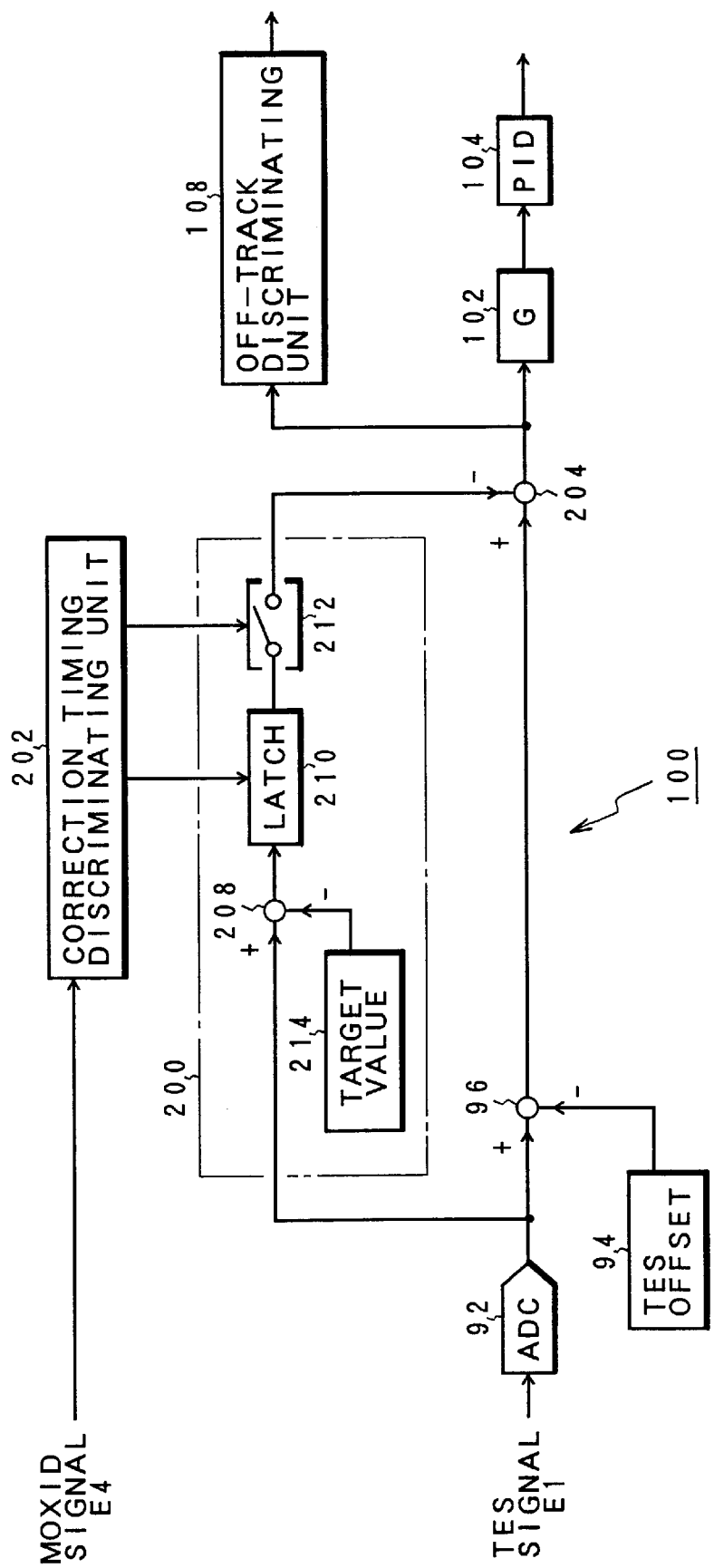

TES SIGNAL
E1

MOXID SIGNAL
E4

TES DATA
(ADC READ VALUE)

CORRECTION VALUE

CORRECTION OUTPUT VALUE

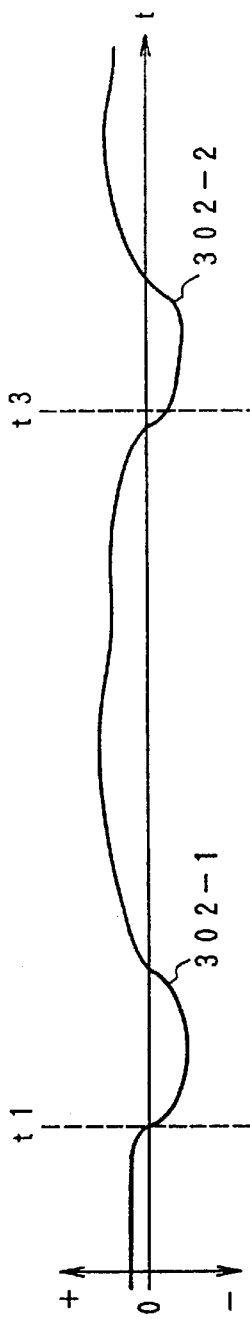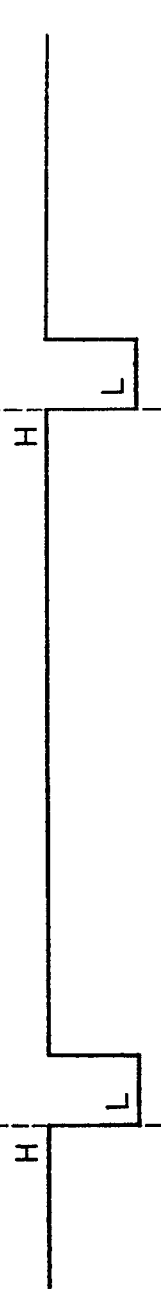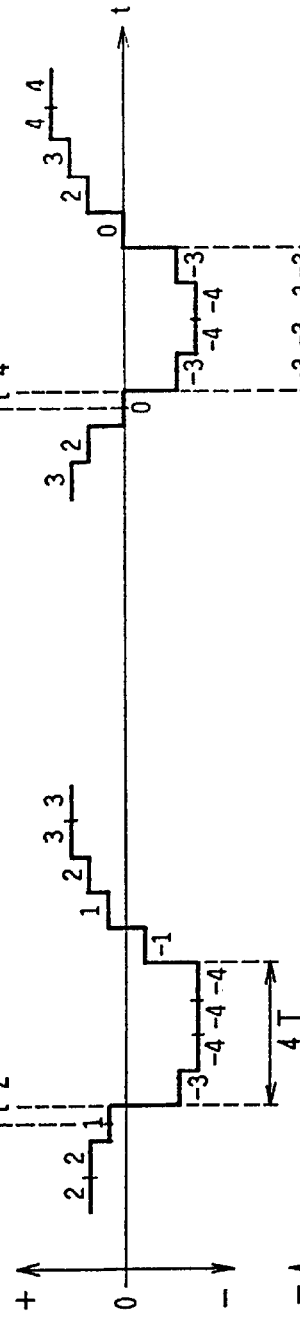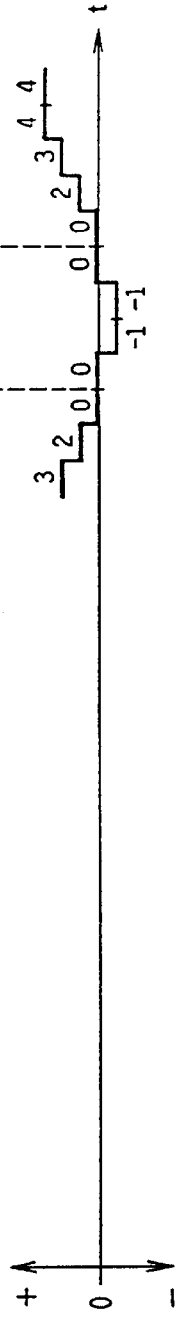
FIG. 14A TES SIGNAL E1
FIG. 14B MOXID SIGNAL E4
FIG. 14C TES DATA (ADC READ VALUE)
FIG. 14D CORRECTION VALUE
FIG. 14E CORRECTION OUTPUT VALUE

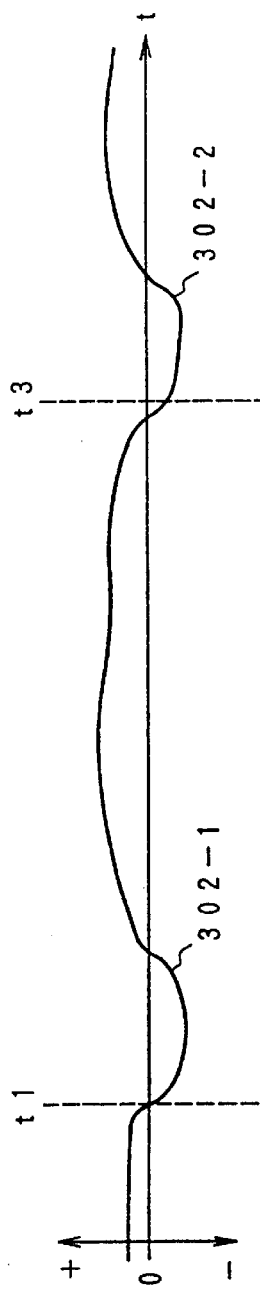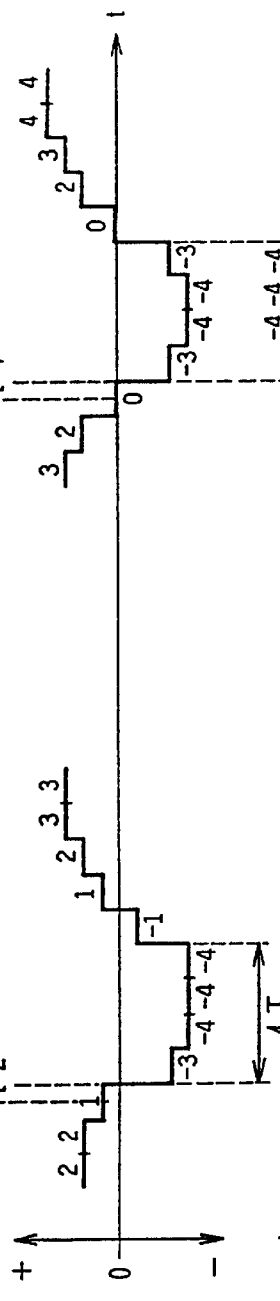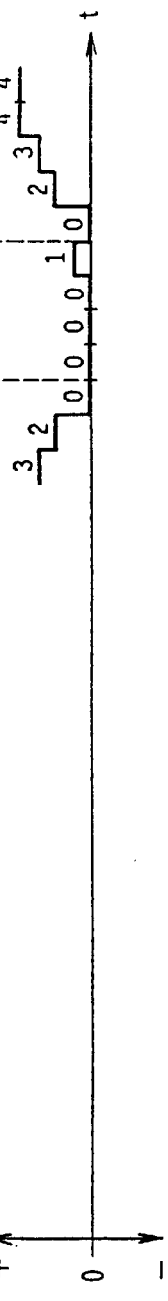
FIG.16A TES SIGNAL E1
FIG.16B MOXID SIGNAL E4
FIG.16C TES DATA (ADC READ VALUE)
FIG.16D CORRECTION VALUE
FIG.16E CORRECTION OUTPUT VALUE

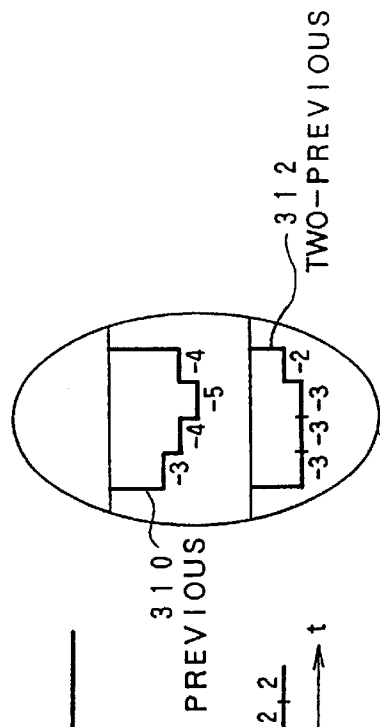
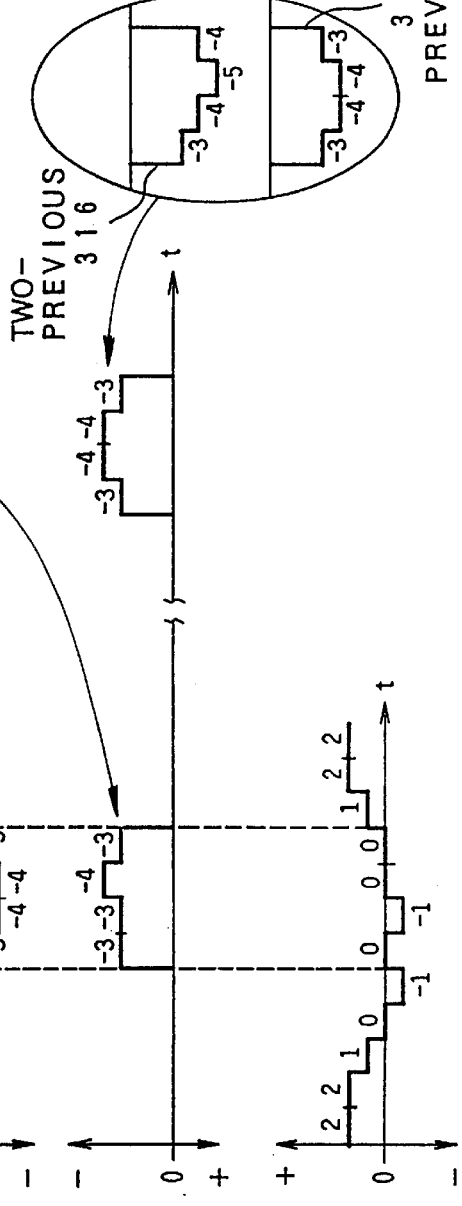
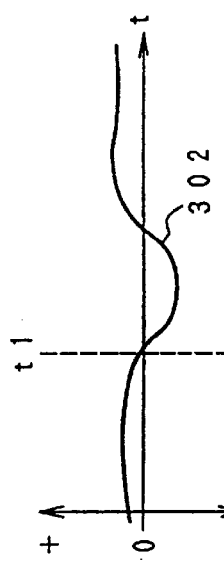
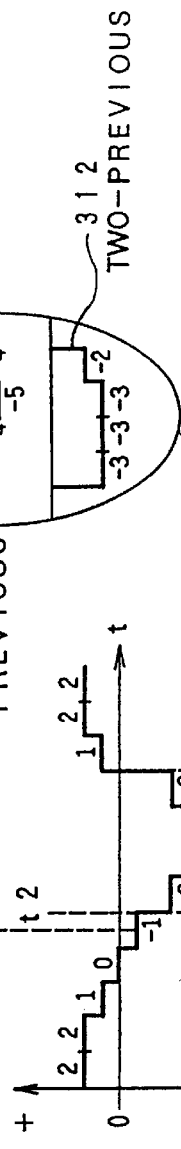
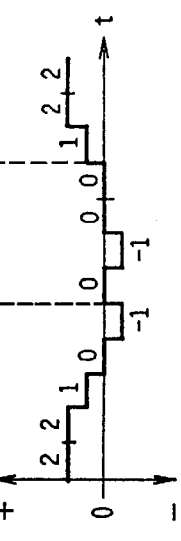
FIG. 18A TES SIGNAL E1
FIG. 18B MOXID SIGNAL E4
FIG. 18C TES DATA (ADC READ VALUE)
FIG. 18D CORRECTION VALUE
FIG. 18E CORRECTION OUTPUT VALUE

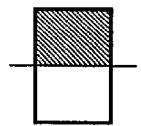
FIG. 19A
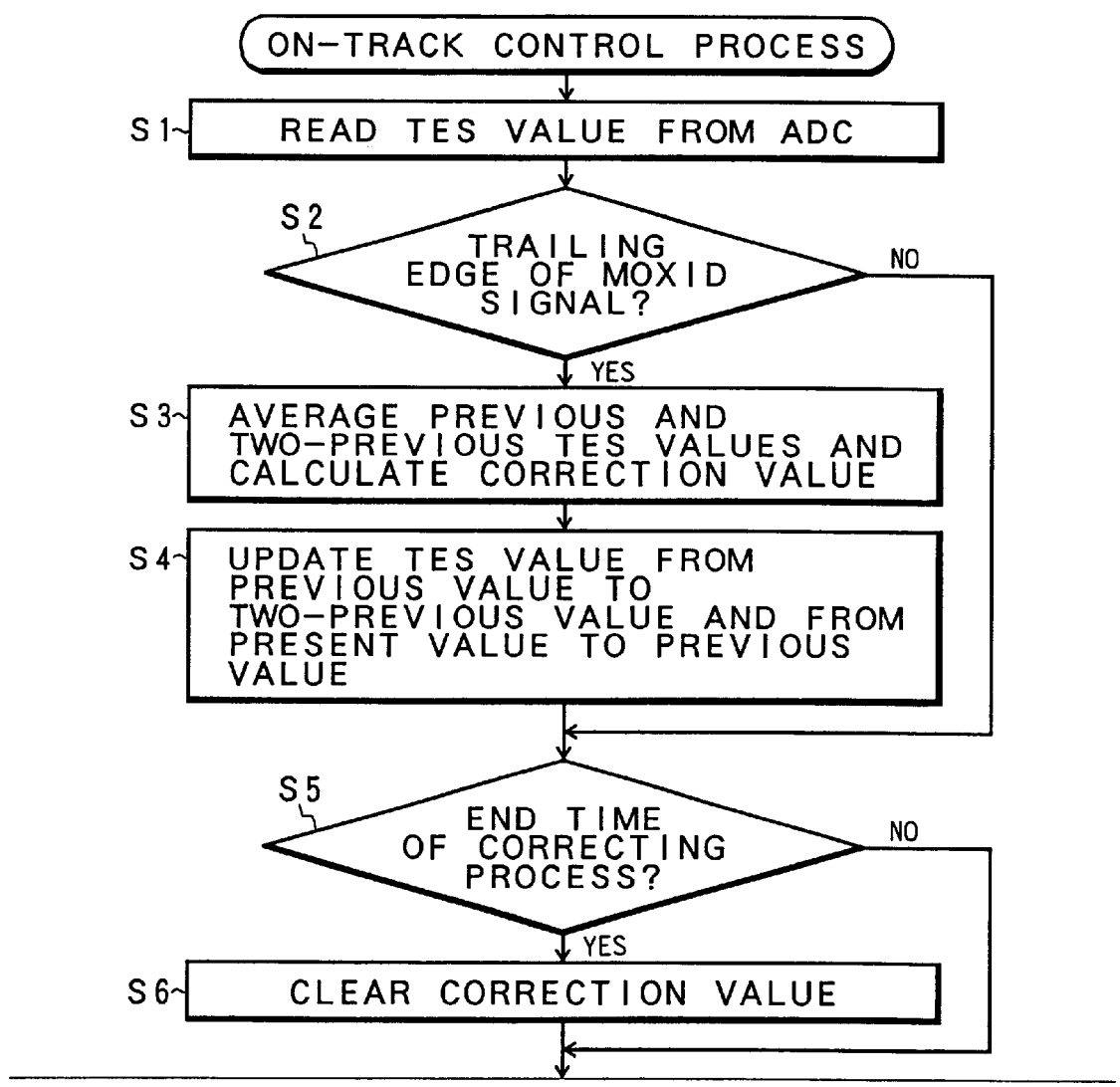

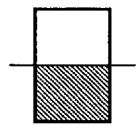
FIG. 19B
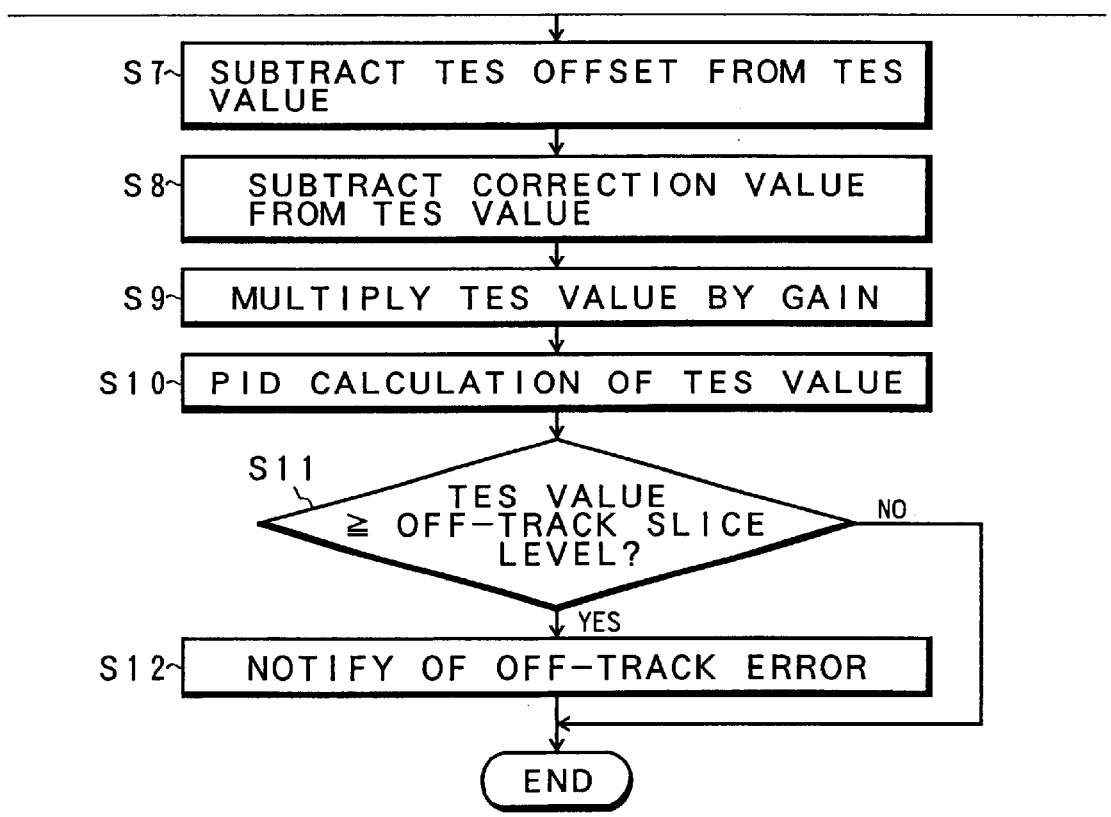

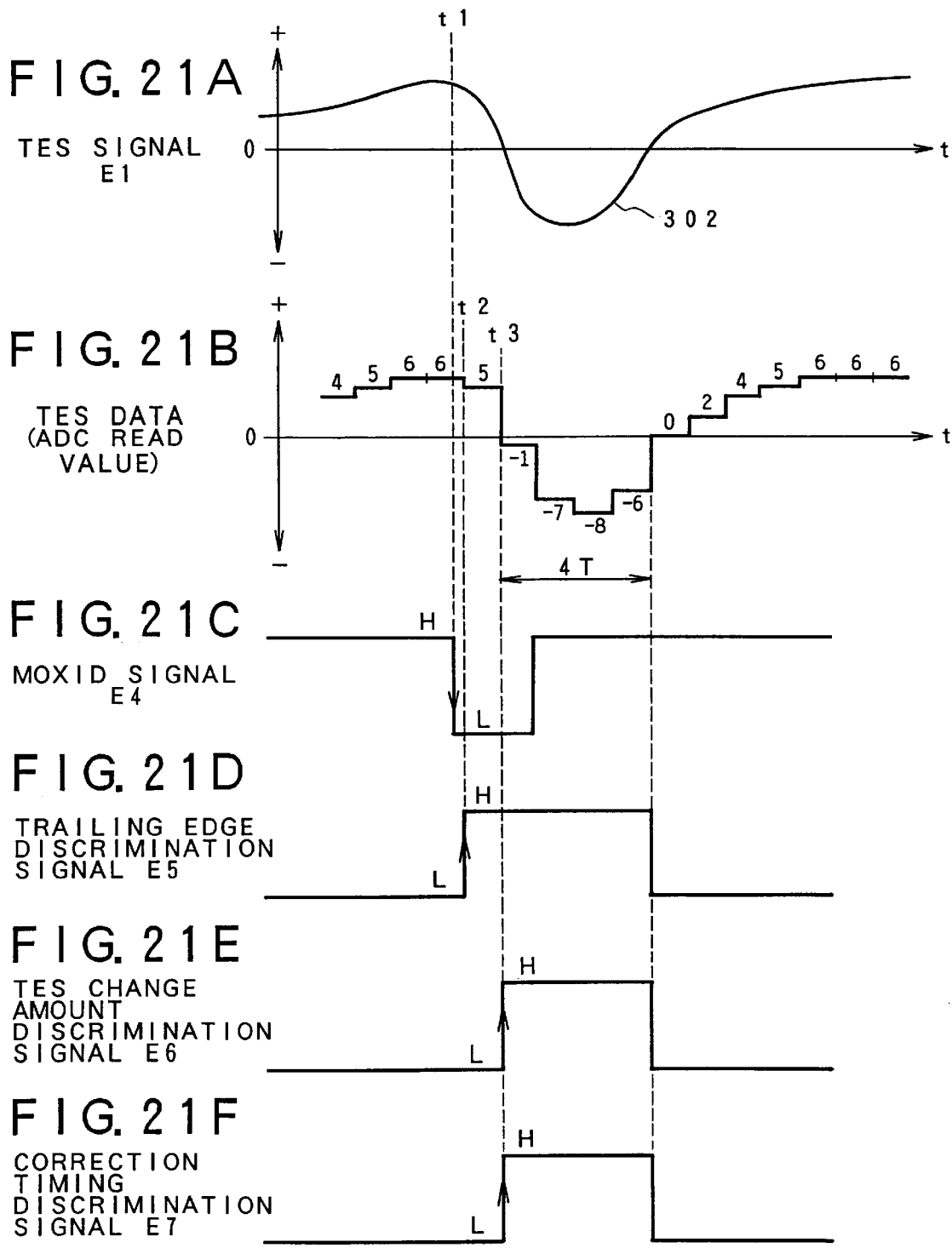

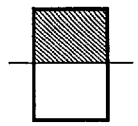
FIG. 22A
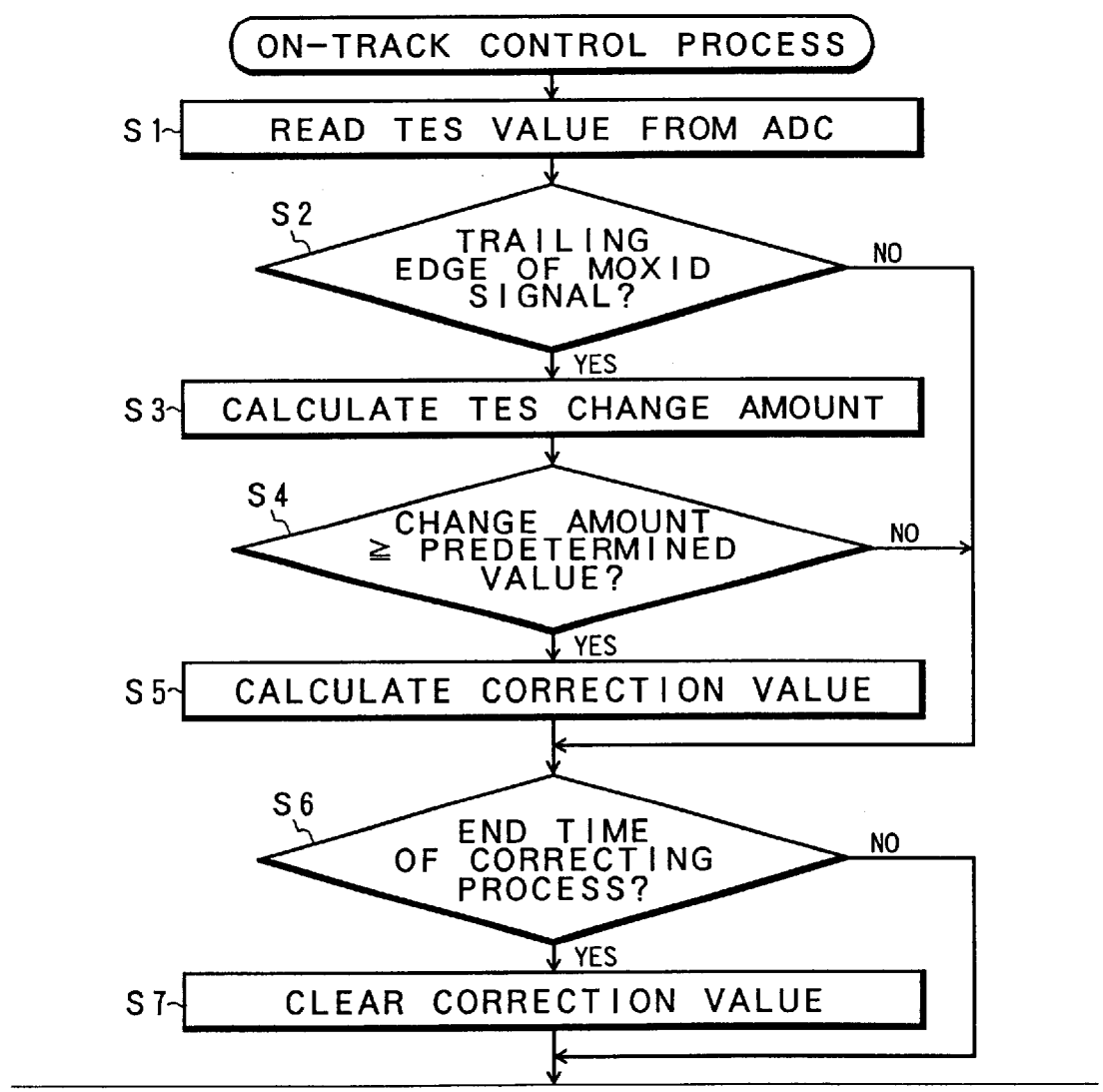

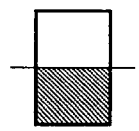
FIG. 22B
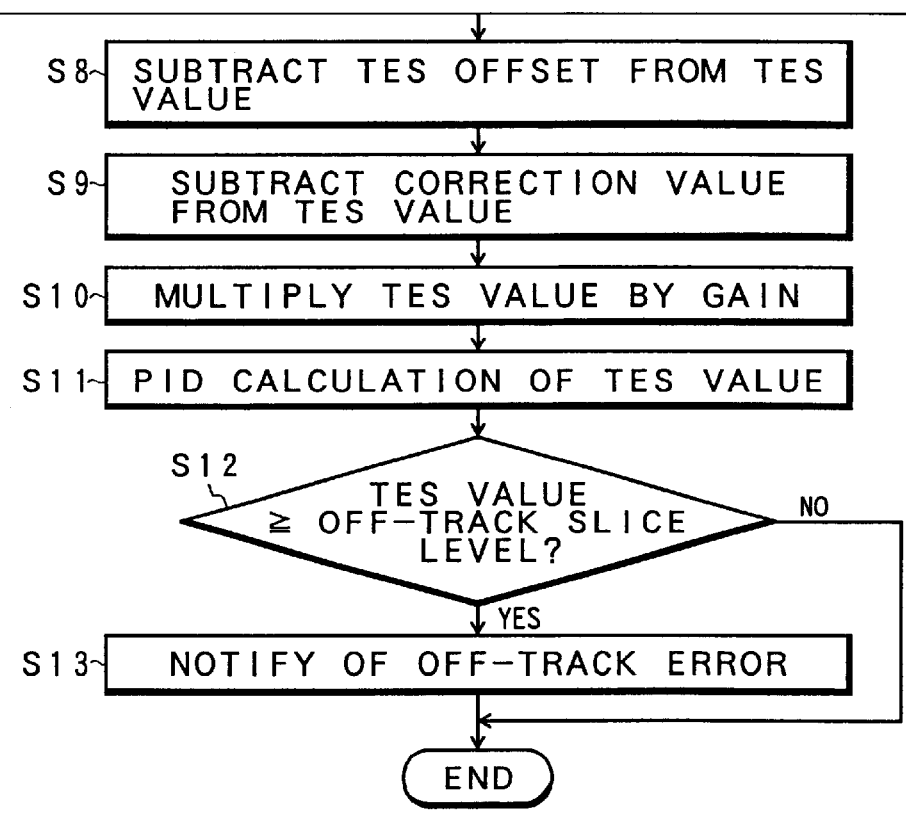

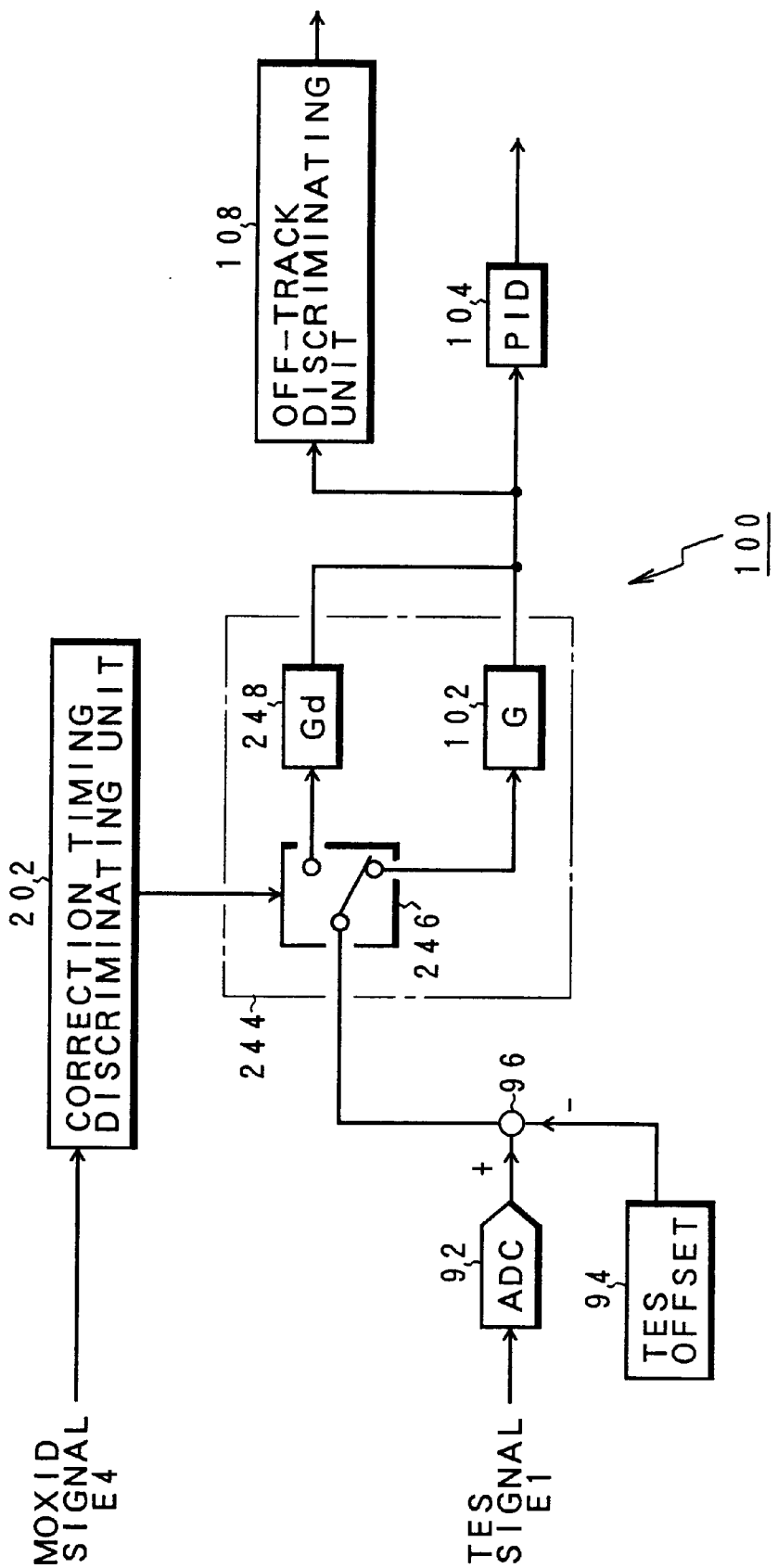

TES SIGNAL E1

MOXID SIGNAL E4

TES DATA
(ADC READ VALUE)

GAIN

CORRECTION
OUTPUT VALUE

TES SIGNAL E1

MOXID SIGNAL E4

TES DATA
(ADC READ VALUE)

CLIP VALUE

CORRECTION
OUTPUT VALUE

OPTICAL STORAGE APPARATUS

BACKGROUND OF THE INVENTION

1. Field of the Invention

The present invention relates to an optical storage apparatus for optically recording and reproducing information to/from an exchangeable medium such as an MO cartridge or the like. More particularly, the invention relates to an optical storage apparatus for suppressing a waveform fluctuation occurring in a tracking error signal each time a laser beam passes an ID portion of a medium track during an on-track control.

2. Description of the Related Arts

Attention is paid to an optical disk as a storing medium as a core of multimedia which has rapidly been developing in recent years. For example, as for an MO cartridge of 3.5 inches, in addition to a conventional MO cartridge of 128 MB, media of a high density recording of 230 MB, 540 MB, and 640 MB have also been provided in recent years. In an optical storage apparatus known as an optical disk drive using such an MO cartridge medium, when a write command or a read command is received from an upper apparatus, a seek control for positioning a laser beam to a target track designated on the medium is executed and the laser beam is pulled in. Subsequently, an on-track control for allowing the laser beam to trace a track center on the basis of a tracking error signal is performed and a writing or reading operation based on a command from the upper apparatus is executed. The on-track control is performed in a manner such that the tracking error signal indicative of a deviation amount from the track center is sampled and read as a digital signal value by an A/D converter every predetermined time, an actuator mounted on a carriage is driven to set an error between a target position showing the track center and the present position to zero, and the position of the laser beam is feedback controlled. When the laser beam passes an ID area constructed by emboss pits arranged at regular intervals on the medium tracks during the on-track control, there is a phenomenon such that a level fluctuation occurs in the tracking error signal. For the fluctuation of the tracking error signal caused by the return light of the ID area, when the signal value sampled by the A/D converter is transmitted through a PID filter, gains of P and D terms or a gain of a D term is reduced from a normal gain by a DSP which executes the on-track control, and a tracing response speed to a sudden level change in the tracking error signal due to the ID area is made dull, thereby preventing the fluctuation of the tracking error signal caused by the return light of the ID area from being added as a disturbance. The suppression of the level fluctuation of the tracking error signal caused by the ID area is basically performed by dropping the gain of the PID filter and making a servo response speed dull. When the gain of the PID filter is dropped, however, since the traceability of the servo becomes dull also with respect to a detection component of an inherent deviation amount included in the fluctuated tracking error signal from the track center, there is naturally a limit for the reduction in the filter gain. Consequently, the suppression of the level fluctuation of the tracking error signal caused by the ID area becomes insufficient and there is a problem that the on-track control becomes unstable. Since the suppression of the level fluctuation of the tracking error signal caused by the ID area is insufficient, there is also another problem such that the signal level exceeds an off-track slice level set for offtrack detection and the off-track is erroneously detected.

SUMMARY OF THE INVENTION

According to the invention, there is provided an optical storage apparatus for reducing an adverse influence by sufficiently suppressing a level fluctuation of a tracking error signal caused by an ID area on a medium track without deteriorating a servo response speed of an on-track control.

According to the invention, there is provided an optical storage apparatus comprising: an actuator for moving an objective lens for irradiating a laser beam onto a medium in the direction traversing tracks of the medium; a tracking error signal forming circuit for forming a tracking error signal according to a position of the laser beam in the direction traversing the tracks on the basis of a photosensitive output of medium return light; a seek control unit for moving the laser beam to a target track by a control of the actuator; and an on-track control unit for allowing the laser beam to trace the target track by the control of the actuator based on the tracking error signal. In the optical storage apparatus, according to the invention, there is provided a correction processing unit for discriminating an interval in which a signal fluctuation appears on the tracking error signal when the laser beam passes an ID area on the medium track during the on-track control and for correcting the tracking error signal so as to reduce the signal fluctuation in the discrimination interval, thereby suppressing the fluctuation of the tracking error signal caused by the ID area and preventing a feedback control for the on-track control from becoming unstable. The correction processing unit comprises a correction timing discriminating unit, a correction value determining unit, and a correcting unit (adder). The correction timing discriminating unit determines the interval in which the level fluctuation of the tracking error signal (TES) due to the ID area on the medium tracks appears as a correction timing. The correction value determining unit determines a correction value which is used to correct the tracking error signal. Further, the correcting unit corrects a read signal value obtained by sampling and digitally converting the tracking error signal by an A/D converter in a predetermined period by using the correction value determined by the correction value determining unit at the correction timing decided by the correction timing discriminating unit. As specific modes of the correction processing unit, there are the following five modes.

(Correction by the difference before and after fluctuation)

The correction value determining unit obtains a difference between the signal value sampled by the A/D converter for the first time after a correction start timing and the signal value sampled by the A/D converter before the correction start timing and determines the difference as a correction value. The correcting unit executes a correction by subtracting the correction value from each of the signal values as many as predetermined sampling periods including the signal value sampled by the A/D converter for the first time after the correction start timing. A change amount between the values before and after the signal fluctuation caused by the ID area is used as a correction value and the fluctuation is reduced by subtracting the correction value from the signal value in the fluctuation interval, thereby enabling the correction according to the degree of the actual signal fluctuation to be properly performed.

(Correction by the difference between the target value and the value just after the fluctuation) The correction value determining unit obtains a difference between the signal value sampled by the A/D converter for the first time after the correction start timing and a predetermined target value and determines the difference as a correction value. The correcting unit executes a correction by subtracting the correction value from each of the signal values as many as predetermined sampling periods including the signal value sampled by the A/D converter for the first time after the correction start timing. As mentioned above, by using the difference between the value just after occurrence of the signal fluctuation and the predetermined target value as a correction value and reducing the fluctuation by subtracting the correction value from the signal value in the fluctuation period, even if there is a variation in the value just before the signal fluctuation, the correction using the correction value according to the signal drop from the target value can be always stably executed.

(Correction by the previous mean value)

The correction value determining unit calculates a mean value of the signal values sampled by the A/D converter in a predetermined sampling period from the correction start timing every correction timing and determines the mean value as a correction value. The correcting unit executes a correction by subtracting the correction value calculated at the previous correction timing from each of the signal values as many as the predetermined sampling periods including the signal value sampled by the A/D converter for the first time after the correction start timing. As mentioned above, the fluctuation is reduced by using the mean value of the sample values in the previous signal fluctuation as a correction value of this time and subtracting the correction value from the signal value in the fluctuation period, thereby enabling the correction corresponding to the preceding signal fluctuation in the ID area to be performed. As compared with the case of determining the correction value from the signal fluctuation at the present time point, even if there is a variation in each TES data obtained by the A/D conversion, a stable correction can be executed.

(Correction by the previous fluctuated waveform)

The correction value determining unit stores the signal values (fluctuated waveform values) sampled by the A/D converter in the predetermined sampling periods from the correction start timing as correction values at each correction timing. The correcting unit executes a correction by reading out the signal value stored at the previous correction timing and subtracting the read-out signal value from each of the signal values as many as the predetermined sampling periods including the signal value sampled by the A/D converter for the first time after the correction start timing. As mentioned above, the fluctuation is reduced by storing the sample value of the fluctuated waveform in the previous signal fluctuation as a correction value and subtracting the correction value from the signal value in the fluctuation period of this time. Consequently, when the degrees of waveform approximation of the signal fluctuation caused by the respective ID areas are high, the correction which almost perfectly suppresses the signal fluctuation can be performed.

(Correction by the mean of fluctuated waveforms of a plurality of times)

The correction value determining unit stores a plurality of signal values read out from the A/D converter for predetermined sampling periods from the correction start timing, calculates a mean value of the signal values at the same sampling position as many as a predetermined number of times which have been already stored, and determines the mean value as a correction value at each correction timing. For example, the correction value determining unit calculates a mean value of the signal values at the same sampling position as many as twice stored in the previous period and the two-previous period and determines the mean value as a correction value at each correction timing. The correcting unit executes a correction by subtracting the mean value of the signal values at the same sampling position determined by the correction value determining unit from each of the signal values as many as the predetermined sampling periods including the signal value sampled by the A/D converter for the first time after the correction start timing. The fluctuation of the tracking error signal caused by the ID area is a differential change such that the signal largely drops in a start portion of the ID area and recovers after that. Consequently, the sample data in the fluctuation interval has similar values depending on the sampling position. In case of obtaining a mean value of the signal fluctuations of a plurality of times, therefore, it is desirable to obtain the mean value at every same sampling position rather than the mean value at every fluctuation. This operation is equivalent to that a waveform mean of the signal fluctuations of a plurality of times is obtained. Thus, the optimum correction of the signal fluctuation is expected.

(Compression of the signal fluctuation)

In another embodiment, the correction processing unit is constructed by a correction timing determining unit and a gain change-over unit. The correction timing discriminating unit discriminates a correction timing when the level fluctuation caused by the ID area on the medium track appears on the tracking error signal. In the gain change-over unit, an amplification gain of the read signal value obtained by sampling and converting the tracking error signal to the digital signal by the A/D converter at a predetermined period is switched to a lower gain at the correction timing determined by the correction timing discriminating unit, thereby suppressing the change in the signal value and reducing the adverse influence. The compression of the signal fluctuation by the gain switching has an advantage such that the processes can be simplified.

(Clipping of the signal fluctuation)

According to another embodiment, the correction processing unit is constructed by a correction timing discriminating unit and a clip processing unit. The correction timing discriminating unit discriminates a correction timing at which the level fluctuation caused by the ID area on the medium track appears on the tracking error signal. In the clip processing unit, the read signal value obtained by sampling and converting the tracking error signal by the A/D converter to the digital signal at a predetermined period is clipped to a signal value just before the correction timing, thereby reducing the adverse influence. By clipping the signal fluctuation to the signal value just before the fluctuation in this manner, the processes are simplified and the signal drop can be certainly prevented.

(Optimum correction timing)

When a drop change of the signal value sampled by the A/D converter which exceeds a predetermined value is detected after the start position of the ID area on the medium track was detected, the correction timing discriminating unit decides this timing as a correction start timing. The correction timing discriminating unit discriminates the correction timing on the basis of an MOXID signal whose signal level is inverted in an MO area and the ID area detected from the return light of the laser beam to the medium track. The MOXID signal is a signal obtained from a photodetector which received the return beam from the medium track. On the other hand, since the tracking error signal which is obtained from the photodetector which similarly received the return beam from the medium track is amplified in an analog manner by an amplifier before it is sampled by the A/D converter and passes through an analog low pass filter, the tracking error signal has a small delay from the MOXID signal. Even if the start timing of the ID area, that is, the correction start timing is discriminated by a trailing edge of the MOXID signal, the tracking error signal does not fluctuate due to the delay, so that it cannot be regarded as the optimum timing. A time point when the MOXID signal trails and the value obtained by sampling the tracking error signal by the A/D converter changes to a value exceeding a predetermined value is consequently decided as an optimum correction timing.

(Off-track slice)

According to the invention, there is further provided an off-track detecting unit for comparing the tracking error signal corrected by the correction processing unit with a predetermined off-track slice value and notifying of an off-track error when the tracking error signal exceeds the predetermined off-track slice value. Consequently, the off-track is detected with respect to the tracking error signal in which the signal fluctuation caused by the ID area has been corrected is detected. Since the signal fluctuation has been properly corrected, an erroneous detection of the off-track can be certainly prevented.

The above and other objects, features, and advantages of the present invention will become more apparent from following detailed description with reference to the drawings.

BRIEF DESCRIPTION OF THE DRAWINGS

FIG. 2 is an explanatory diagram of an internal structure of an apparatus in which an MO cartridge is loaded;

FIG. 4 is an explanatory diagram of ON/OFF of a servo control mode of an analog switch in FIGS. 3A and 3B;

FIG. 5 is an explanatory diagram of the servo control mode in FIG. 4;

FIGS. 7A to 7D are time charts obtained by enlarging the signals in FIGS. 6A to 6D by a time base;

FIG. 10 is a flowchart for the correcting process in FIG. 8;

FIG. 11 is a functional block diagram of the second embodiment of the correction processing unit in FIGS. 3A and 3B in which a correction is performed by a difference between a target value and a signal value just after the fluctuation;

FIGS. 14A to 14E are time charts for the correcting process in FIG. 13;

FIGS. 16A to 16E are time charts for the correcting process in FIG. 15;

FIGS. 18A to 18E are time charts for the correcting process in FIG. 17;

FIGS. 19A and 19B are flowcharts for the correcting process in FIG. 17;

FIGS. 21A to 21F are time charts for the discriminating process in FIG. 20;

FIGS. 22A and 22B are flowcharts for a correcting process including the discriminating process in FIG. 20;

FIG. 23 is a functional block diagram of the seventh embodiment of the correction processing unit in FIGS. 3A and 3B in which the signal fluctuation is compressed by a gain switching;

DETAILED DESCRIPTION OF THE PREFERRED EMBODIMENTS (Apparatus construction)

Figure 1A:
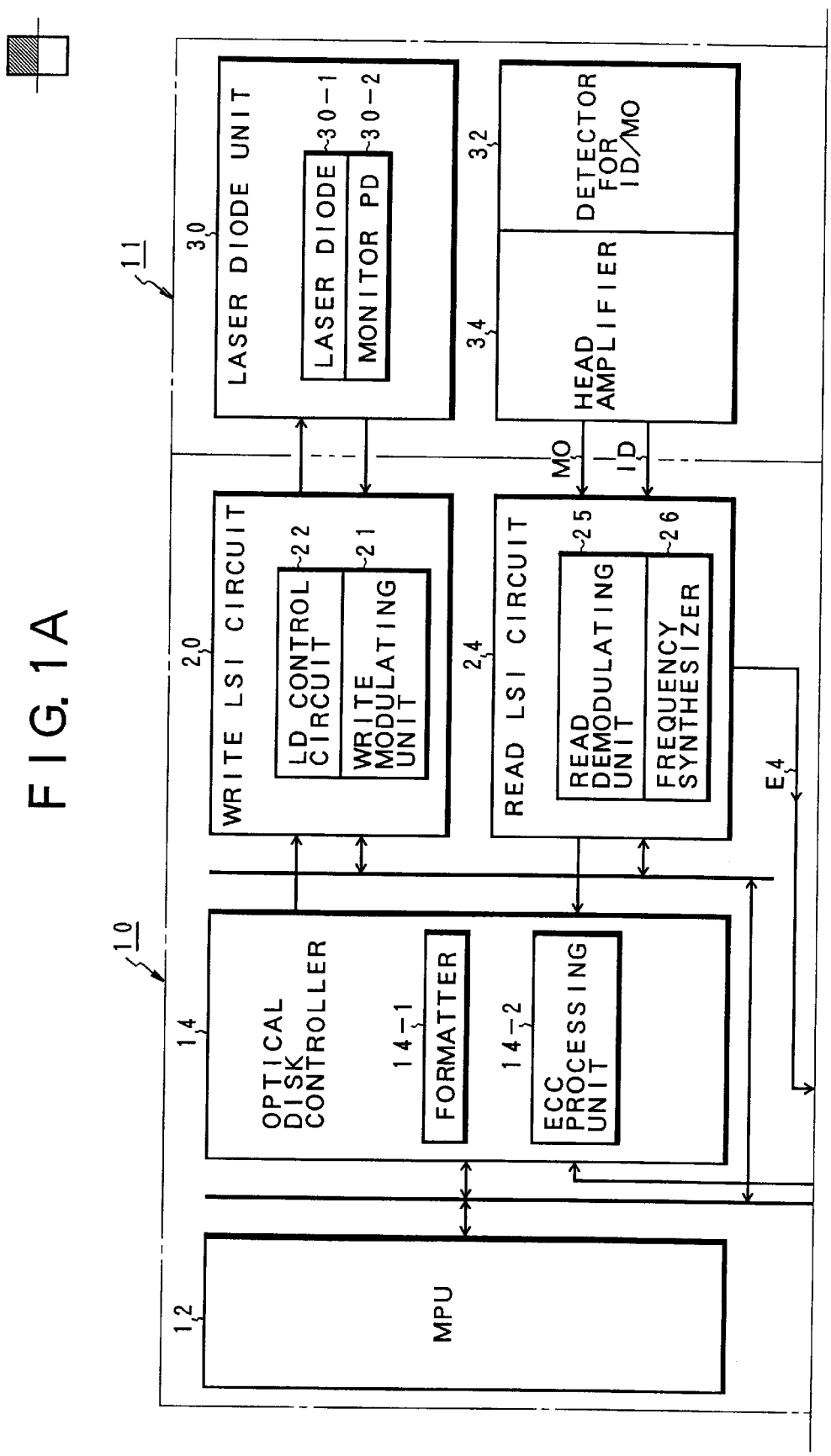
FIGS. 1A and 1B are block diagrams of an optical disk drive according to the invention.
Figure 1B:
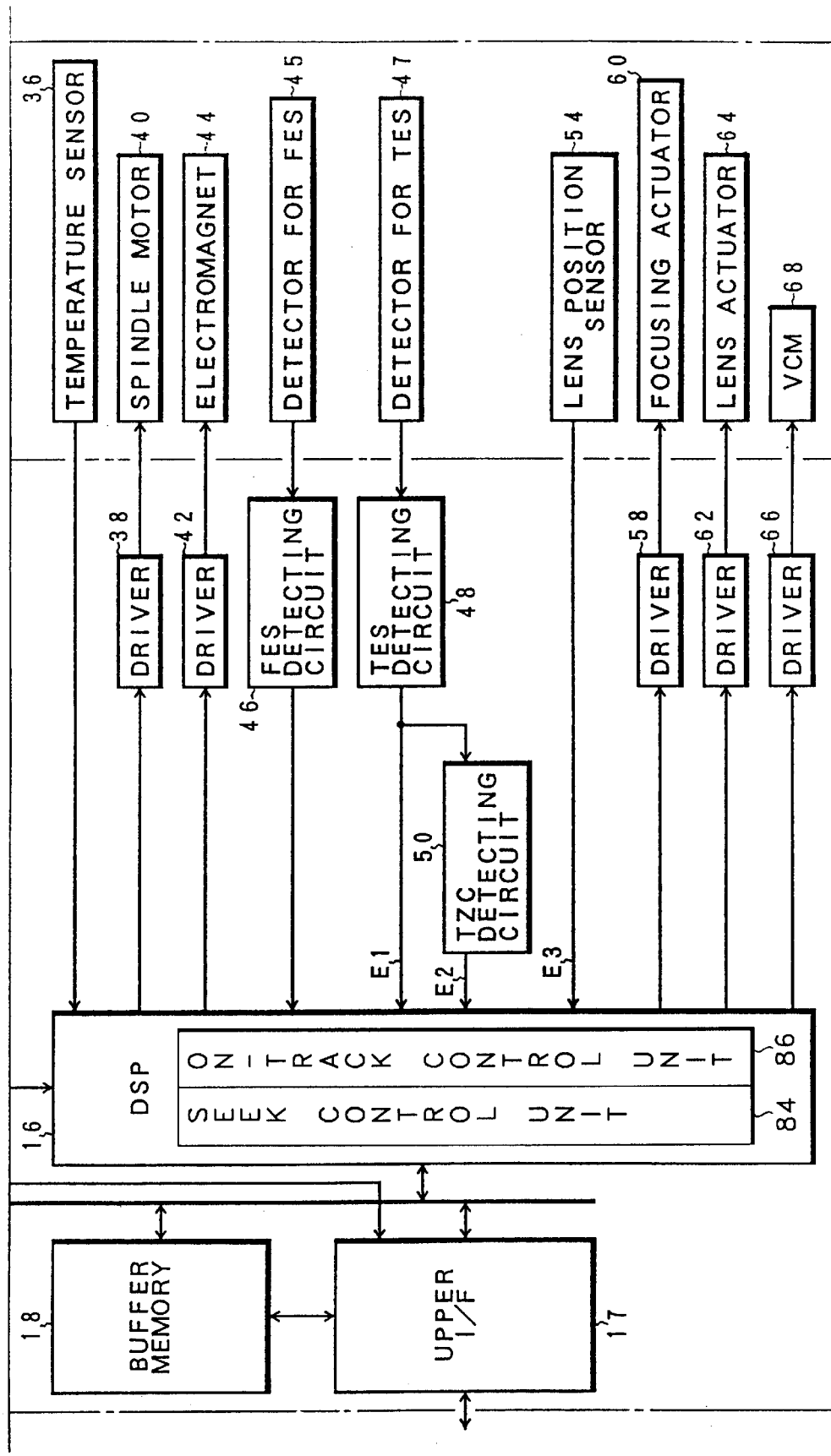

FIGS. 1A and 1B are circuit block diagrams of an optical disk drive as an optical storage apparatus of the invention. The optical disk drive of the invention is constructed by a control unit 10 and an enclosure 11. An MPU 12 to perform a whole control of the optical disk drive, an interface 17 to transmit and receive commands and data to/from an upper apparatus, an optical disk controller (ODC) 14 to perform processes which are necessary to read and write data to/from an optical disk medium, a DSP 16, and a buffer memory 18 are provided for the control unit 10. The buffer memory 18 is commonly used by the MPU 12, optical disk controller 14, and upper interface 17. A formatter 14-1 and an ECC processing unit 14-2 are provided for the optical disk controller 14. At the time of a write access, the formatter 14-1 divides NRZ write data on a sector unit basis of the medium and forms a recording format. The ECC processing unit 14-2 forms an ECC code on a sector write data unit basis and adds it and, further, forms a CRC code and adds it as necessary. Further, sector data after completion of an ECC encoding is converted into, for example, a 1-7 RLL code. At the time of a read access, demodulated sector read data is 1-7 RLL inverse converted, a CRC check is performed by the ECC processing unit 14-2, and after that, error detection and correction are performed. Further, in the formatter 14-1, the NRZ data of the sector unit is coupled, thereby forming a stream of NRZ read data and transferring to the upper apparatus. A write LSI circuit 20 is provided for the optical disk controller 14. A write modulating unit 21 and a laser diode control circuit 22 are provided for the write LSI circuit 20. A control output of the laser diode control circuit 22 is supplied to a laser diode unit 30 provided for the optical unit on the enclosure 11 side. The laser diode unit 30 integratedly has a laser diode 30-1 and a detector 30-2 for monitoring. The write modulating unit 21 converts the write data into a data format of the PPM recording or PWM recording. In the embodiment, as an optical disk for recording and reproducing by using the laser diode unit 30, namely, as a rewritable MO cartridge medium, any one of the media of 128 MB, 230 MB, 540 MB, and 640 MB can be used. Among them, with respect to the MO cartridge medium of 128 MB, the pit position recording (PPM recording) in which data is recorded in correspondence to the presence or absence of marks on the medium is used. A recording format of the medium is a zone CAV and the number of zones of a user area is set to one zone in case of the 128 MB medium. As for the MO cartridge media of 230 MB, 540 MB, and 640 MB for performing the high density recording, the pulse width recording (PWM recording) in which edges of the mark, namely, a leading edge and a trailing edge are made correspond to data is used. A difference between storage capacities of the 640 MB medium and the 540 MB medium is caused by a difference between sector capacities. When the sector capacity is equal to 2048 bytes, the storage capacity is equal to 640 MB. When the sector capacity is equal to 512 bytes, the storage capacity is equal to 540 MB. The recording format of the medium is the zone CAV and the number of zones of a user area is equal to 10 zones in case of the 230 MB medium, 11 zones in case of the 640 MB medium, and 18 zones in case of the 540 MB medium. The optical disk drive of the invention as mentioned above can cope with the MO cartridge of each storage capacity of 128 MB, 230 MB, 540 MB, or 640 MB. When the MO cartridge is loaded into the optical disk drive, therefore, an ID portion formed by the emboss pits of the medium is first read, a kind of medium is recognized by the MPU 12 from a pit interval, and a recognition result of the kind is notified to the write LSI circuit 20. The sector write data from the optical disk drive 14 is converted to the PPM recording data by the write modulating unit 21 in case of the 128 MB medium and is converted to the PWM recording data in case of the medium of 230 MB, 540 MB, or 640 MB. The PPM recording data or PWM recording data converted by the write modulating unit 21 is supplied to the laser diode control circuit 22 and is written to the medium by a light emission driving of the laser diode 30-1. As a reading system for the optical disk drive 14, a read LSI circuit 24 is provided. A read demodulating unit 25 and a frequency synthesizer 26 are built in the read LSI circuit 24. A photosensitive signal of the return light of a laser beam from the laser diode 30-1 by a detector 32 for ID/MO provided for the enclosure 11 is inputted as an ID signal and an MO signal to the read LSI circuit 24 through a head amplifier 34. Circuit functions of an AGC circuit, a filter, a sector mark detecting circuit, and the like are provided for the read demodulating unit 25 of the read LSI circuit 24. A read clock and read data are formed from the inputted ID signal and MO signal. The PPM recording data or PWM recording data are demodulated to the original NRZ data. Since the zone CAV is used as a control of a spindle motor 40, a setting control of a frequency dividing ratio for generating a zone corresponding clock frequency is performed from the MPU 12 to the frequency synthesizer 26 built in the read LSI circuit 24. The frequency synthesizer 26 is a PLL circuit having a programmable frequency divider and generates a reference clock, as a read clock, having a predetermined peculiar frequency in accordance with the zone position of the medium. That is, the frequency synthesizer 26 is constructed by the PLL circuit having the programmable frequency divider and generates a reference clock of a frequency fo according to a frequency dividing ratio (m/n) set by the MPU 12 in accordance with the zone number on the basis of the following equation.

$$fo=(m/n) \cdot fi$$

A frequency division value (n) of the denominator of the frequency dividing ratio (m/n) is a peculiar value according to the kind of medium of 128 MB, 230 MB, 540 MB, or 640 MB. A frequency division value (m) of the numerator is a value which changes in accordance with the zone position of the medium and has been prepared as table information of the value corresponding to the zone number with respect to each medium. The read LSI circuit 24 further generates an MOXID signal E4 to the DSP 16. The MOXID signal E4 is a signal which rises to the H level (bit 1) in an MO area serving as a data area and trails to the L level (bit 0) in an ID area in which the emboss pits have been formed. The MOXID signal E4 is a signal showing physical positions of the MO area and ID area on the medium track. The read data demodulated by the read LSI circuit 24 is supplied to the optical disk controller 14 and is 1-7 RLL inverse converted. After that, it is subjected to a CRC check and an ECC process by an encoding function of the ECC processing unit 14-2, so that NRZ sector data is reconstructed and is coupled to the stream of the NRZ read data by the formatter 14-1. After that, the resultant data is transferred to the upper apparatus by the upper interface 17 via the buffer memory 18. A detection signal of a temperature sensor 36 provided on the enclosure 11 side is inputted to the MPU 12 via the DSP 16. On the basis of an environment temperature of the unit in the apparatus detected by the temperature sensor 36, the MPU 12 controls each of the light emitting powers for reading, writing, and erasing in the laser diode control circuit 22 to an optimum value. The MPU 12 controls the spindle motor 40 provided on the enclosure 11 side by a driver 38 via the DSP 16. Since the recording format of the MO cartridge is the zone CAV, the spindle motor 40 is rotated at a constant velocity of, for example, 3000 rpm. The MPU 12 also controls an electromagnet 44 provided on the enclosure 11 side through a driver 42 via the DSP 16. The electromagnet 44 is arranged on the side opposite to the beam irradiating side of the MO cartridge loaded in the apparatus and supplies an external magnetic field to the medium upon recording and erasing.

The DSP 16 has a servo function to position the beam from the laser diode unit 30 to the medium. The DSP has: a seek control unit 84 for seeking to a target track and performing an on-track; and an on-track control unit 86 for allowing the seek control unit 84 to pull in the beam to the target track and, after that, trace the beam to the track center. To realize the servo function of the DSP 16, a detector 45 for FES to receive the beam return light from the medium is provided for the optical unit on the enclosure 11 side. An FES detecting circuit (focusing error signal detecting circuit) 46 forms a focusing error signal from a photosensitive output of the FES detector 45 and supplies to the DSP 16. A detector 47 for TES to receive the beam return light from the medium is provided for the optical unit on the enclosure 11 side. A TES detecting circuit (tracking error signal detecting circuit) 48 forms a tracking error signal E1 from a photosensitive output of the TES detector 47 and supplies to the DSP 16. The tracking error signal E1 is inputted to a TZC detecting circuit (track zero-cross point detecting circuit) 50, by which a track zero-cross pulse E2 is formed and inputted to the DSP 16. A lens position sensor 54 to detect the lens position of an objective lens for irradiating the laser beam to the medium is provided on the enclosure 11 side. A lens position detection signal (LPOS) E3 from the lens position sensor is inputted to the DSP 16. Further, to control the position of the beam spot on the medium, the DSP 16 drives and controls a focusing actuator 60, a lens actuator 64, and a VCM 68 through drivers 58, 62, and 66, respectively.

An outline of the enclosure 11 is as shown in FIG. 2. The spindle motor 40 is provided in a housing 67. By inserting an MO cartridge 70 from an inlet door 69 side to a hub of a rotary shaft of the spindle motor 40, a loading such that an internal MO medium 72 is attached to a hub of the rotary shaft of the spindle motor 40 is executed. A carriage 76 which is movable by the VCM 68 in the direction traversing the medium tracks is provided under the MO medium 72 of the loaded MO cartridge 70. An objective lens 80 is mounted on the carriage 76. The beam from the laser diode provided in a fixed optical system 78 enters the objective lens 80 through a prism 82, thereby forming a beam spot image onto the surface of the MO medium 72. The objective lens 80 is moved in the optical axial direction by the focusing actuator 60 in FIGS. 1A and 1B. The objective lens can be also moved by the lens actuator 64 in the radial direction traversing the medium tracks within a range of, for instance, tens of tracks. The position of the objective lens 80 mounted on the carriage 76 is detected by the lens position sensor 54 in FIGS. 1A and 1B. The lens position sensor 54 sets the lens position detection signal to zero at the neutral position where the optical axis of the objective lens 80 is directed right above the lens and generates the lens position detection signal E3 according to a movement amount of a different polarity for each of the movement to the outer side and the movement to the inner side.

Figure 3A:
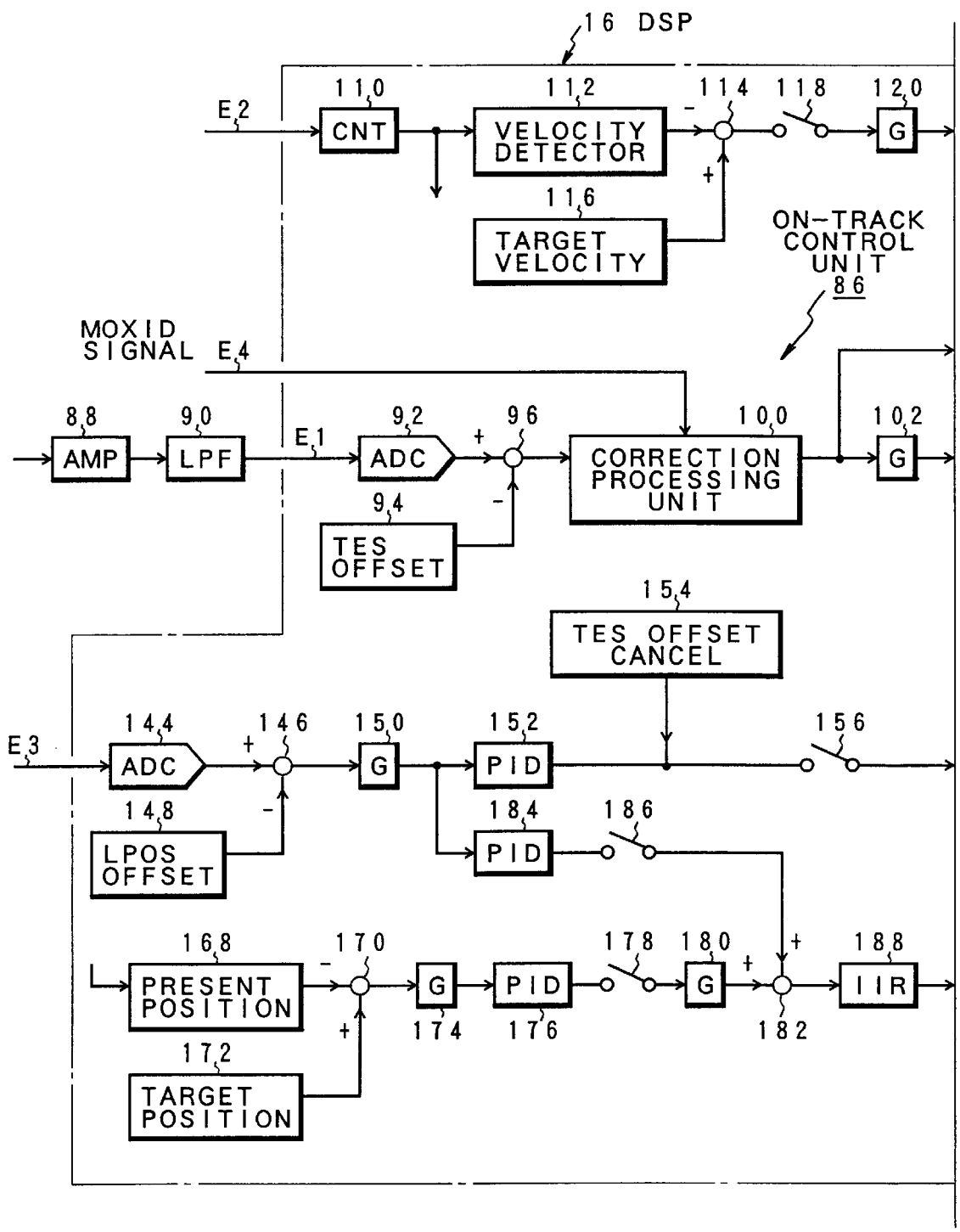
FIGS. 3A and 3B are functional block diagrams of a servo system which is realized by a DSP in FIGS. 1A and 1B.
Figure 3B:
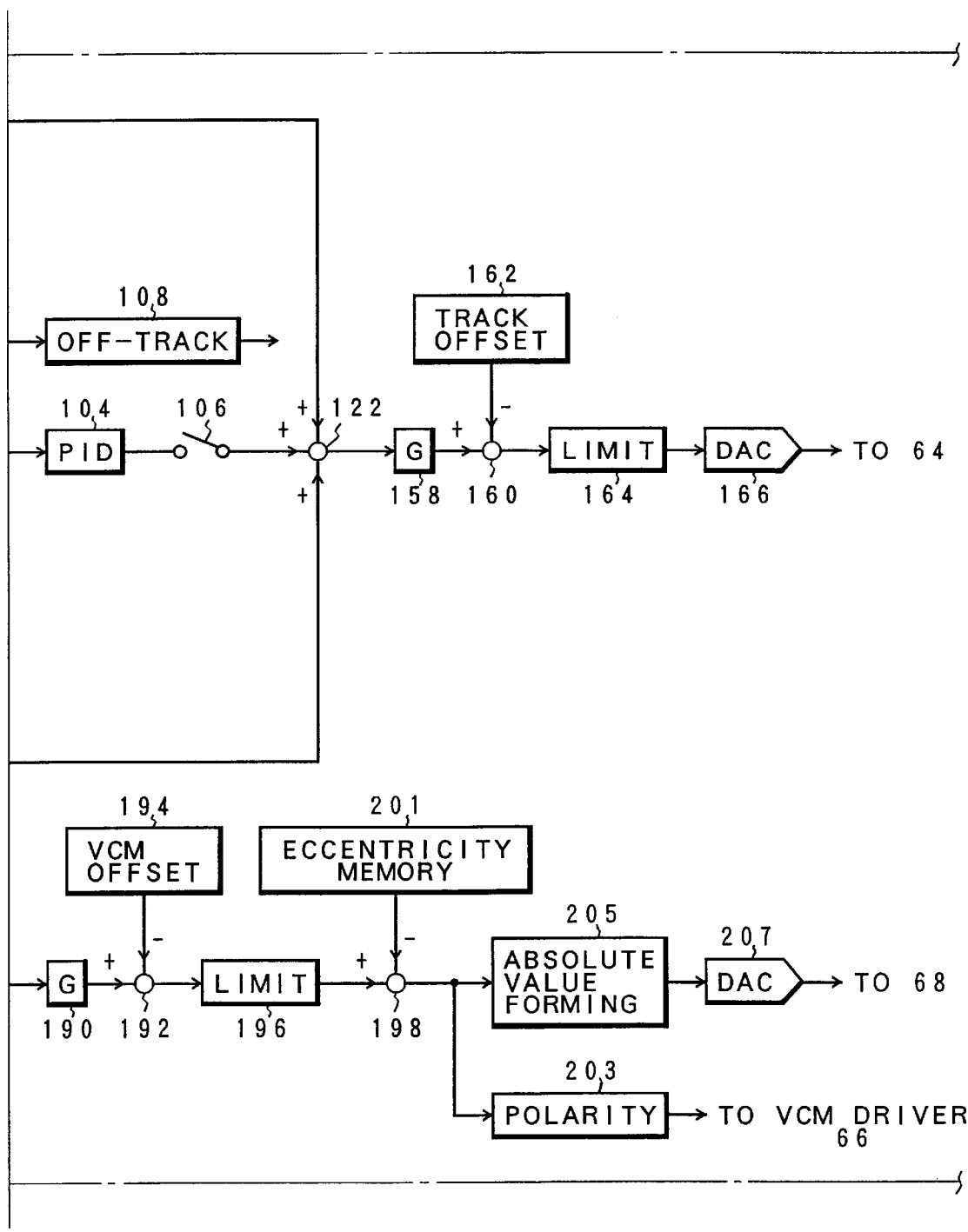

FIGS. 3A and 3B are functional block diagrams of the seek control unit and the on-track control unit which are realized by the DSP 16 provided for the control unit 10. A lens servo system for the lens actuator 64 which functions as a main section of a low speed seek control will be first described. The lens servo system is divided into three systems of a speed control system, an on-track servo system, and a lens position servo system. First, the speed control system inputs the track zero-cross signal E2 to a track counter 110, obtains a time of a track zero-cross interval from a clock count, and obtains a beam speed by a velocity detector 112. A difference between an output of the velocity detector 112 and a target speed from a register 116 is obtained by an adder 114. A phase compensation with respect to the speed error is performed by a phase compensator 120 through a servo switch 118. After that, the resultant signal is inputted to an adder 122. In the on-track servo system corresponding to the on-track control unit 86 in FIGS. 1A and 1B, the tracking error signal E1 transmitted through an amplifier 88 and a low pass filter 90 provided for the TES detecting circuit 48 in FIGS. 1A and 1B is inputted to an A/D converter 92, is sampled by the A/D converter 92 by a sampling clock of a predetermined frequency, is converted into digital data (hereinafter, referred to as "TES data"), and the TES data is inputted to the DSP 16. By an adder 96, the TES data read by the A/D converter 92 is subjected to a correction of a TES offset set by a register 94.

The corrected data is subsequently inputted to a correction processing unit 100 to correct a signal fluctuation in the ID area according to the invention. The MOXID signal E4 is inputted to the correction processing unit 100. A correction timing is discriminated from a trailing edge to the L level of the MOXID signal E4, thereby performing a correction to suppress the signal fluctuation for predetermined sampling periods, for example, four sampling periods 4T from the detection of the trailing edge. The TES data corrected by the correction processing unit 100 is multiplied by a gain by a compensator 102, thereby increasing a high band gain for the purpose of phase compensation. After that, arithmetic operations of proportion, integration, and differentiation are executed by a PID arithmetic operation unit (PID filer) 104. Subsequently, the resultant data is inputted to the adder 122 through a servo switch 106. The TES data corrected by the correction processing unit 100 is inputted to an off-track discriminating unit 108. When the level of the TES data exceeds a predetermined off-track slice level, an off-track detection signal is notified to the optical disk controller 14 in FIGS. 1A and 1B. The reading/writing operation is inhibited until an off-track error is eliminated. Further, as a lens position servo system, the lens position detection signal E3 is fetched as digital data by an A/D converter 144. A correction of an LPOS offset by a register 148 is performed by an adder 146 and the corrected data is subjected to a phase compensation by a phase compensator 150. After that, proportion, integration, and differentiation arithmetic operations are performed by a PID arithmetic operation unit 152 and the resultant data is inputted to the adder 122 through a servo switch 156. A TES offset cancel can be applied to the input side of the servo switch 156 by a register 154. The speed error signal of the speed control system, the tracking error signal of the on-track servo system, and further, the lens position error signal of the lens position servo system are added by the adder 122. The resultant addition signal is phase compensated by a phase compensator 158. After that, in an adder 160, the compensated signal is subjected to a correction of a track offset by a register 162. Subsequently, it is converted into an analog signal by a D/A converter 166 and is outputted to the driver side as a current instruction value for the lens actuator 64.

The servo system of the VCM 64 which functions as a main section in the high speed seek control will now be described. The servo system of the VCM 68 constructs a servo system of a feed-forward control based on a difference between the target track position upon seeking and the present track position. First, the present position by a register 168 of the beam detected by the counter 110 on the basis of the track zero-cross signal E2 is compared with a target track position in a register 172 by an adder 170, thereby forming a position error signal corresponding to the number of remaining tracks for the target track position. An output of the adder 170 is phase compensated by a phase compensator 174. After that, it is subjected to proportion, integration, and differentiation arithmetic operations by a PID arithmetic operation unit 176 and is further phase compensated by a phase compensator 180 through a servo switch 178 and is inputted to an IIR 188 through an adder 182. Further, after the phase compensation was performed by a phase compensator 190, in an adder 192, the compensated signal is subjected to a correction by a VCM offset by a register 194 and is inputted to an adder 198 through a limit 196. In the adder 198, an eccentricity correction of the medium by the read-out from an eccentricity memory 201 is performed. Different polarities according to the seek in the inner direction and the seek in the outer direction are set by a register 203 to the position error signal of the VCM servo subjected to the eccentricity correction by the adder 198. The resultant signal is further subjected to an absolute valuing process by an absolute value forming circuit 205, is converted into an analog signal by a D/A converter 207, is converted into a VCM current instruction value for the VCM 68, and is outputted to the driver side. Moreover, an output of the phase compensator 150 of a lens position servo system provided for the lens servo system is branched and is inputted to the adder 182 of the VCM servo system through a PID arithmetic operation unit 184 and a servo switch 186. Therefore, when the objective lens is driven by the lens actuator 64 in the on state of the servo switch 186 and the lens is sought, a lens position error signal which is formed by the adder 146 on the basis of a lens position detection signal in this instance is supplied as a position error signal to the adder 182 of the VCM position servo system through the PID arithmetic operation unit 184 and servo switch 186. Therefore, the VCM 68 controls the position of the carriage by the driving of the lens actuator 64 so as to set a lens position offset to zero. Since the servo control based on the error signal of the lens position detection signal by the lens actuator as mentioned above is applied to the servo system of the VCM 68, it is called a double servo.

FIG. 4 shows the control mode which is allocated to the servo systems in FIGS. 3A and 3B and the on/off states of the servo switches 118, 106, 156, 178, and 186. The control mode of the servo system is classified into a track-off mode, a track-on mode (on-track control mode), a fine seek mode, and a position seek mode. The control contents of each mode are as shown in FIG. 5. In the track-off mode, in a state where the focusing servo is valid, the servo switch 156 is turned on, thereby performing a control so that the objective lens is moved to the zero position by the lens actuator 64. In the track-off mode, therefore, only the focusing of the beam to the medium can be performed in the stop state of the beam. In the track-on mode (on-track control mode), by turning on the servo switch 106 in a state where the focusing servo is valid, the on-track control by the driving of the lens actuator 64 by the tracking error signal is executed. Further, by turning on the servo switch 186, a position servo by the lens position detection signal is applied to the VCM servo system, thereby enabling the VCM offset or eccentricity offset to be compensated. In the track-on mode, the correcting process of the invention for the signal fluctuation of the tracking error signal caused by the ID area is performed. In the fine seek mode, when an access to a target cylinder is instructed from the upper apparatus, a control is performed so as to move the beam to the target position by the speed control of the lens actuator 64 and the feed-forward control of the VCM 68. That is, by turning on the servo switch 118 in a state where the focusing servo is valid, the speed control of the lens actuator 64 is executed. Further, by turning on the servo switch 178, the feed-forward control according to the error of the present track position from the target track is performed. By turning on the servo switch 186, the double servo to control the lens to the zero position by the driving of the VCM 68 on the basis of the position error of the lens position detection signal E3 is performed. The position seek mode relates to the lens position control by the lens actuator 64 and the position of the VCM 68 is controlled in a manner such that in a state where the lens is held at the zero position, the beam is moved to the target track by the position error signal according to the number of tracks of the present track position from the target track position. That is, a lens lock such that the servo switch 156 is turned on in a state where the focusing servo is valid and the lens is held at the zero position by the lens actuator 64 is performed. By turning on the servo switch 178 in this state, the carriage is moved by the VCM 68 so as to set the error from the target track position to zero, thereby performing a position control so as to move the beam to the target track.

(Fluctuation of the tracking error signal)

Figures 6A, 6B, 6C, 6D:
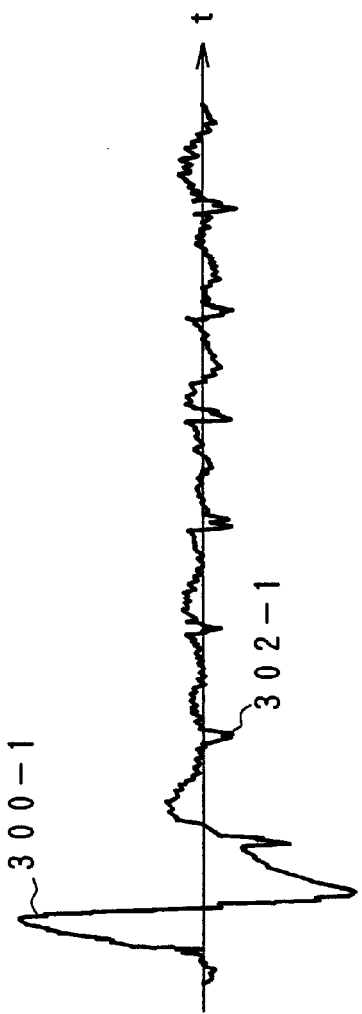
FIGS. 6A to 6D are time charts for a tracking error signal, an MOXID signal, and an ADC read value which are obtained during an on-track control.

FIGS. 6A to 6D are time charts for the tracking error signal and MOXID signal which are obtained during the on-track control in the on-track control unit 86 provided for the DSP 16 in FIGS. 3A and 3B and the TES data of the A/D converter. FIG. 6A shows the tracking error signal (TES) which is derived from an output of the amplifier 88 in FIGS. 3A and 3B. FIG. 6B shows the tracking error signal E1 which is obtained from an output of the low pass filter 90 in FIGS. 3A and 3B. FIG. 6C shows the MOXID signal E4 which is derived from the read LSI circuit 24 in FIGS. 1A and 1B. Further, FIG. 6D shows the TES data sampled by the A/D converter 92 in FIGS. 3A and 3B. As for the tracking error signal as an output of the amplifier 88 in FIG. 6A, since the track format of the MO medium 72 in FIG. 2 relates to spiral tracks, a track jump such that the beam is returned to the original track by one track at a specified position of every rotation of the track during the on-track control is performed. A 1-track seek waveform 300-1 by the track jump is obtained. Subsequently, a feedback control to drive the lens actuator so as to eliminate a difference between the signal level and the zero signal level showing the track center by the on-track control for the target track is performed. A waveform fluctuation 302-1 such that the signal waveform drops at regular intervals occurs in the signal waveform during the on-track control. FIG. 6B shows the tracking error signal E1 which is obtained by transmitting the waveform of the tracking error signal of FIG. 6A through the low pass filter 90 and is inputted to the DSP 16. By transmitting the low pass filter 90, the high band component is removed and an amplitude component of a head track jump seek waveform 300-2 decreases. A subsequent signal fluctuation 302-2 during the on-track control is also suppressed as compared with FIG. 6A. Tracking error signal E1 in FIG. 6B is delayed by a predetermined delay time from the tracking error signal of FIG. 6A because it passes through the low pass filter 90. The signal fluctuations 302-1 and 302-2 in which the signal drops occur in FIGS. 6A and 6B occur in a trailing interval at the L level in the MOXID signal E4 in FIG. 6E. As for the MOXID signal E4, the signal level derived from the return light of the laser beam irradiated to the MO area (data area) of the medium track is at the H level (bit 1). The signal level by the return light from the ID portion where the emboss pits have been formed trails to the L level (bit 0). Therefore, the timing when the signal fluctuation 302-2 occurs in the tracking error signal E1 in FIG. 6B, namely, the correction start timing to start the correction of the signal fluctuation 302-2 can be discriminated by the trailing edge to the L level of the MOXID signal E4. As for the TES data by the A/D converter 92 in FIG. 6D, the sampling operation is started when the pull-in of the tracking error signal E1 by the head 1-track seek is set to a predetermined level or less. A sampling frequency of the A/D converter 92 is equal to, for example, 68 kHz.

FIGS. 7A to 7D enlargedly show each signal during the on-track control in FIGS. 6A to 6D with respect to the time base. For the signal fluctuation 302-1 caused by the ID area of the tracking error signal serving as an output of the amplifier 88 in FIG. 7A, the signal fluctuation 302-2 of the tracking error signal E1 serving as an output of the low pass filter 90 in FIG. 7B is time delayed due to the passage through the low pass filter 90. The MOXID signal E4 in FIG.

7C is obtained almost synchronously with the waveform fluctuation 302-1 of the tracking error signal serving as an output of the amplifier 88 in FIG. 7A. The signal fluctuation 302-1 of the tracking error signal E1 by the ID portion of the medium track is also largely fluctuated in a digital manner like a data fluctuation 302-3 of the TES data derived from the A/D converter in FIG. 7D. If the tracking error signal E1 is used as it is for the on-track control, it is added as a disturbance to the on-track servo system and the tracking control becomes unstable. In the extreme case, such a disturbance causes a control abnormality and the off-track is caused. In the invention, therefore, a correction interval is discriminated on the basis of the trailing edge of the MOXID signal E4 in FIG. 7C. The TES data read by the A/D converter 92 in FIG. 7D in this correction interval is corrected for the waveform fluctuation interval, thereby reducing the adverse influence due to the signal fluctuation of the tracking error signal caused by the ID portion.

(Correction by the difference before and after the fluctuation)

Figure 8:
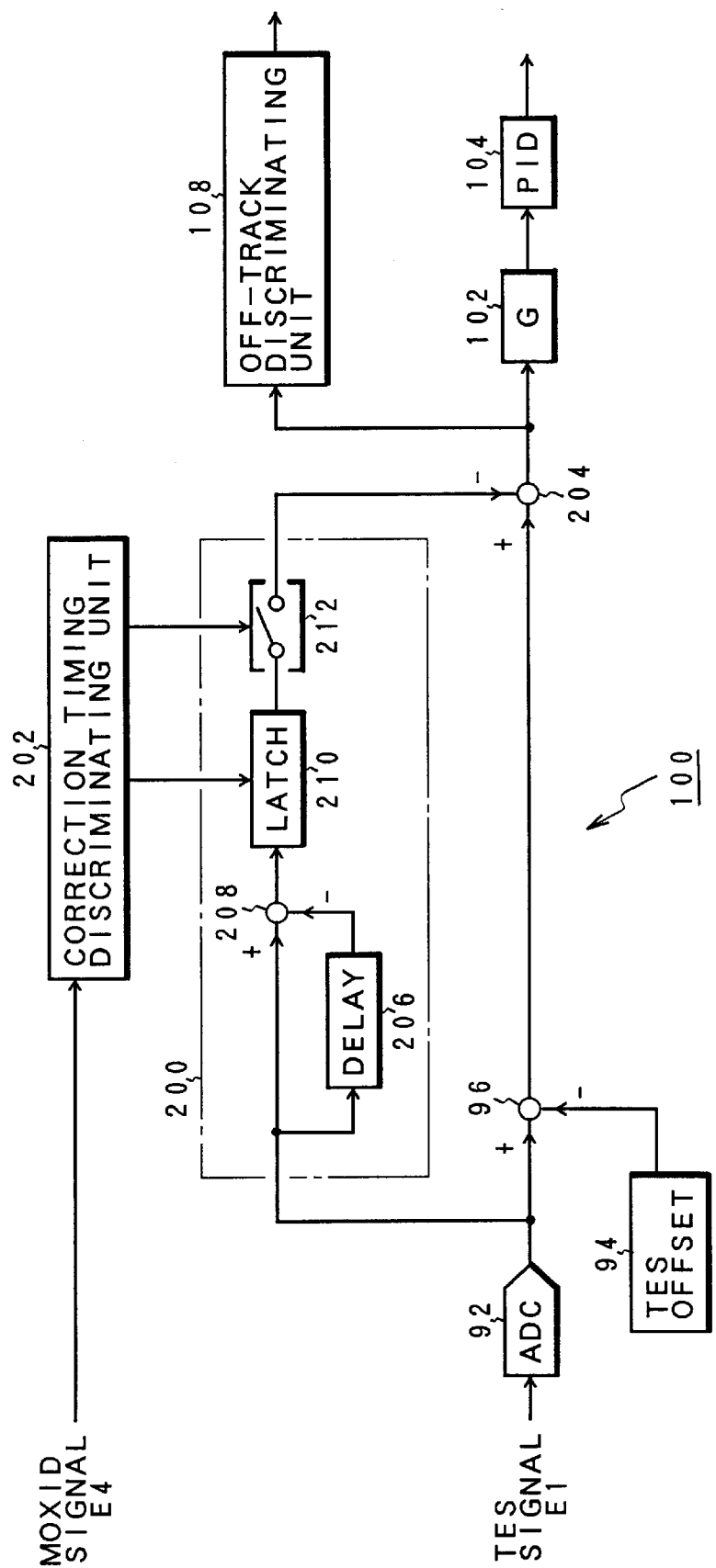
FIG. 8 is a functional block diagram of the first embodiment of a correction processing unit in FIGS. 3A and 3B in which a correction is performed by a difference between the fluctuations before and after a signal fluctuation.

FIG. 8 is a functional block diagram of the first embodiment of the correction processing unit 100 provided in the on-track control unit 86 in FIGS. 3A and 3B. The first embodiment is characterized in that the TES data is corrected on the basis of a difference between the signal fluctuation just before and that just after the signal fluctuation occurring in the tracking error signal caused by the ID portion of the medium track. The correction processing unit 100 provided subsequent to the A/D converter 92 and adder 96 is constructed by a correction value calculating unit 200, a correction timing discriminating unit 202, and an adder 204 for correction. A delay unit 206, an adder 208, a latch 210, and a correction value output switch 212 are provided for the correction value calculating unit 200. The delay unit 206 and adder 208 obtain a difference between the TES data derived from the A/D converter 92 at the present sampling point and the TES data obtained by the previous sample which was delayed by one sampling period by the delay unit 206. The latch 210 latches the difference value of the TES data which is outputted from the adder 208 as a correction value at the correction start timing determined by the correction timing discriminating unit 202. The correction value output switch 212 is turned on for a predetermined period, for instance, four sampling periods 4T from the correction start timing by the correction timing discriminating unit 202, generates a correction value latched by the latch 210 to the adder 204 for correction, and subtracts the correction value from the TES data which is sequentially sampled by the A/D converter 92 for such a period of time, thereby correcting. The correction timing discriminating unit 202 inputs the MOXID signal E4 and monitors the trailing edge to the L level. When the trailing edge to the L level of the MOXID signal E4 is detected, the correction value obtained from the adder 208 synchronously with the sampling of the A/D converter 92 just after is latched. Further, the correction value output switch 212 is turned on for a predetermined correction interval from the latch timing when the control signal is outputted to the latch 210, for example, for four sampling periods 4T. The correction value held in the latch 210 is outputted to the adder 204 for correction, thereby correcting.

Figure 9A:
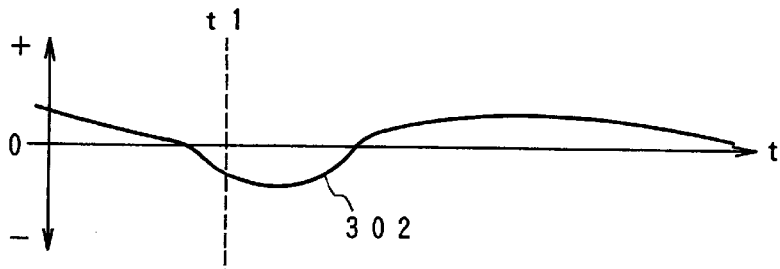
FIGS. 9A to 9E are time charts for the correcting process in FIG. 8.
Figure 9B:
Figure 9C:
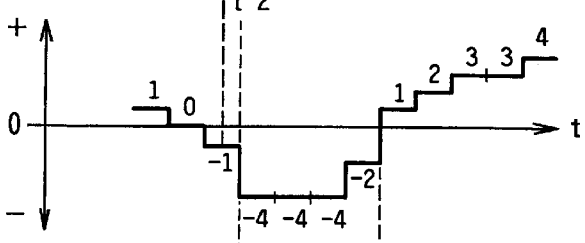
Figure 9D:
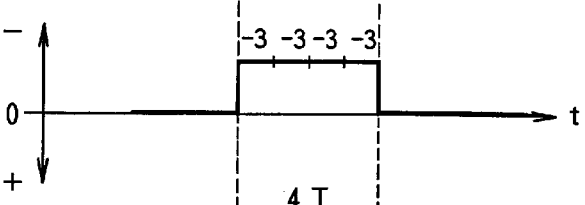
Figure 9E:
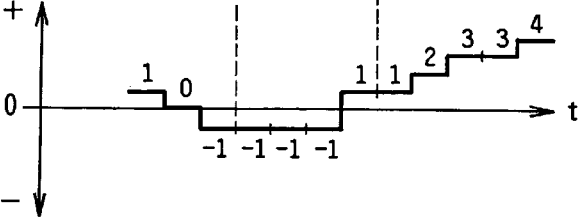

FIGS. 9A to 9E are time charts for the correcting process of FIG. 8. FIG. 9A shows the tracking error signal E1 which is inputted to the A/D converter 92. The signal E1 includes a signal fluctuation 302 in which the signal drops by the ID portion on the medium track. FIG. 9B shows the MOXID signal E4 which trails from the H level to the L level at time t1 and the trailing edge is detected. FIG. 9C shows the TES data obtained by sampling the tracking error signal E1 in FIG. 9A by the A/D converter 92 at predetermined sampling periods and converting into digital data. The portion of the signal fluctuation 302 in the tracking error signal E1 in FIG. 9A is extracted and changes like, for example, ". . . 1, 0, −1, −4, −4, −4, −2, 1, 2, 3, 3, 4 . . . ". As for the TES data, when the trailing edge of the L level of the MOXID signal E4 at time ti is detected, the correction timing discriminating unit 202 in FIG. 8 outputs a control signal to the latch 210 at first sampling start time t2 of the A/D converter 92 just after and latches the output of the adder 208. In this instance, the TES data "−4" obtained at a sampling timing t2 and the TES data "−1" of one sampling period before which was delayed by the delay unit 206 are inputted to the adder 208. Thus, a difference value "−3" is outputted as a difference between them from the adder 208 and is held as a correction value into the latch 210. As shown in FIG. 9D, since the correction value output switch 212 in FIG. 8 is ON for four sampling periods 4T from the sampling timing at time t2, the correction value "−3" is outputted to the adder 204 for correction at each of the four sampling periods. The correcting adder 204 subtracts the correction value "−3" held in the latch 210 with respect to each of the TES data "−4, −4, −4, −2" which is obtained by the sampling of four times from the sampling timing t2, so that correction output values "−1, −1, −1, −1" can be obtained as shown in FIG. 9E. By the correction, as for the drop of the signal level caused by the ID portion of the TES data read by the A/D converter 90 in FIG. 9A, the fluctuation can be sufficiently suppressed as shown in FIG. 9E. The stable on-track control is realized.

FIG. 10 is a flowchart for the on-track control process including the correcting process in the first embodiment of FIG. 8. The processes are repetitively executed synchronously with the sampling clock of the A/D converter 92. First in step S1, the TES data obtained by the sampling of the A/D converter 92 is read. In step S2, a check is made to see if the trailing edge of the MOXID signal has been detected. When the trailing edge is detected, a correction value is calculated in step S3. In case of the first embodiment of FIG. 8, the correction value is calculated as a difference between the TES data just after the trailing edge and the TES data at the previous sampling timing. In step S4, a check is made to see if a predetermined correction end time, for instance, four sampling periods 4T have come. If the correction is being performed within the correction end time, in step S6, the TES offset set in the register 94 is subtracted from the TES data in the adder 96. In step S7, a correcting process to subtract the correction value from the TES data by the correcting adder 204 is performed. In step S8, a phase compensation to multiply the TES data by the gain is executed. A PID calculation is performed with respect to the TES data in step S9. A calculation result is finally converted to analog data by the D/A converter 166 as shown in FIGS. 3A and 3B and a drive current is supplied to the lens actuator 64. In step S10, an off-track discrimination by the off-track discriminating unit 108 to which the correction TES data corrected by the correcting adder 204 is inputted is performed, namely, a predetermined offset slice level is compared with the TES data. If the TES data is less than the offset slice level, the processes are finished. If the TES data exceeds the offset slice level, an off-track error is notified in step S11. The process accompanied with the correcting process for subtracting the correction value from the TES data in step S7 as mentioned above is repeated every sampling clock until the predetermined correction end time, for instance, four sampling periods 4T come in step S4.

When the correction end time comes in step S4, step S5 follows, the correction value is cleared, and the apparatus waits for the next correcting process. For a period of time until the next correcting process, the calculating process of the correction value in step S3 is skipped until the trailing edge of the MOXID signal is detected in step S2 every sampling period. In this instance, since the correction value has been cleared, even if the correction value is subtracted from the TES data in step S7, the correction value is equal to 0, so that the correction of the TES data is not performed. The data obtained from the A/D converter 92 is directly inputted to the gain multiplication in step S8.

(Correction by the difference between the target value and the value just after the fluctuation)

FIG. 11 is a functional block diagram of the second embodiment of the correction processing unit 100 provided for the on-track control unit 86 in FIGS. 3A and 3B. The second embodiment is characterized in that a correction is performed by a difference between the value just after the fluctuation of the tracking error signal caused by the ID portion and the predetermined target value. The correction processing unit 100 is constructed by the correction value calculating unit 200, correction timing discriminating unit 202, and adder 204 for correction. The correction value calculating unit 200 is constructed by a target value register 214, adder 208, latch 210, and correction value output switch 212. That is, the second embodiment differs from the first embodiment of FIG. 8 with respect to a point that the target value register 214 is provided in place of the delay unit 206. The correction timing discriminating unit 202 is also almost the same as that of the first embodiment in FIG. 8. When the trailing edge of the MOXID signal E4 is detected, the control signal is outputted to the latch 210 at the first sampling start timing of the A/D converter 92 just after such a detection. A difference between the target value outputted from the adder 208 and the TES data corresponding to the signal value which was sampled and dropped at that time is held as a correction value. The correction value held in the latch 210 is outputted to the adder 204 for correction for the ON period of time of four sampling periods 4T by the correction timing discriminating unit 202 and the correction is performed. As a target value which is set in the target value register 214, the value of the TES data in a state where the signal drop due to the ID portion does not occur, for example, a target value "0" is used.

Figure 12A:
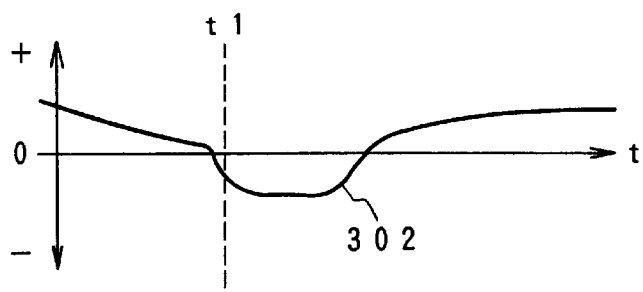
FIGS. 12A to 12E are time charts for the correcting process in FIG. 11.
Figure 12B:
Figure 12C:
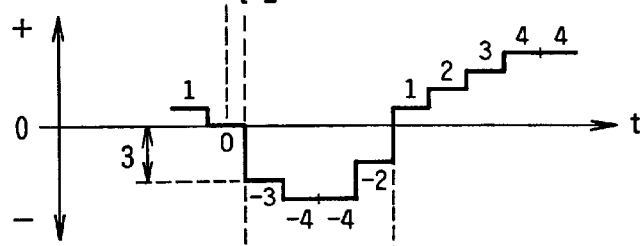
Figure 12D:
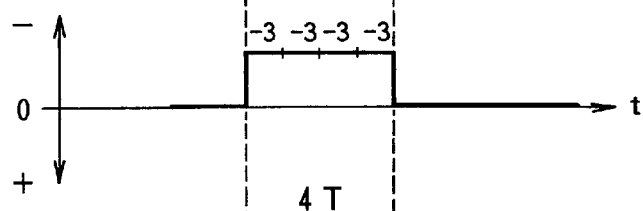
Figure 12E:
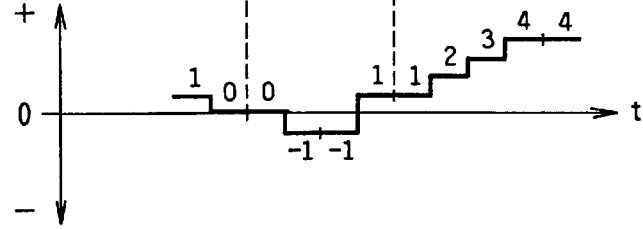

FIGS. 12A to 12E are time charts for the correcting process in the second embodiment of FIG. 11. In the TES signal E1 in FIG. 12A, the signal fluctuation 302 in which the signal drops in correspondence to the ID portion on the medium track occurs. The MOXID signal E4 in FIG. 12B trails from the H level to the L level at time t1 and a trailing edge is detected. Therefore, the correction timing discriminating unit 202 in FIG. 11 holds a difference between the target value "0" which is outputted from the adder 208 and the TES data in this instance at the first sampling timing of the A/D converter 92 of time t2 just after the discriminating time t1 of the trailing edge. Since the target value at this time is equal to "0" and the TES data by the sampling at time t2 is equal to "−3", the adder 208 generates a difference value "−3" and this value is held in the latch 210. The correction value "−3" held in the latch 210 is outputted to the correcting adder 204 for subsequent four sampling periods 4T as shown in FIG. 12D. Thus, the TES data "−3, −4, −4, −2" from the A/D converter 92 is corrected to correction TES data "0, −1, −1, −1" as shown in FIG. 12E and the signal fluctuation can be sufficiently reduced. A flowchart for the on-track control process including the correcting process in the second embodiment of FIG. 11 is substantially the same as that of the first embodiment of FIG. 10 except for a different point that the target value is used for the calculation of the correction value in step S3.

(Correction by the previous mean value)

Figure 13:
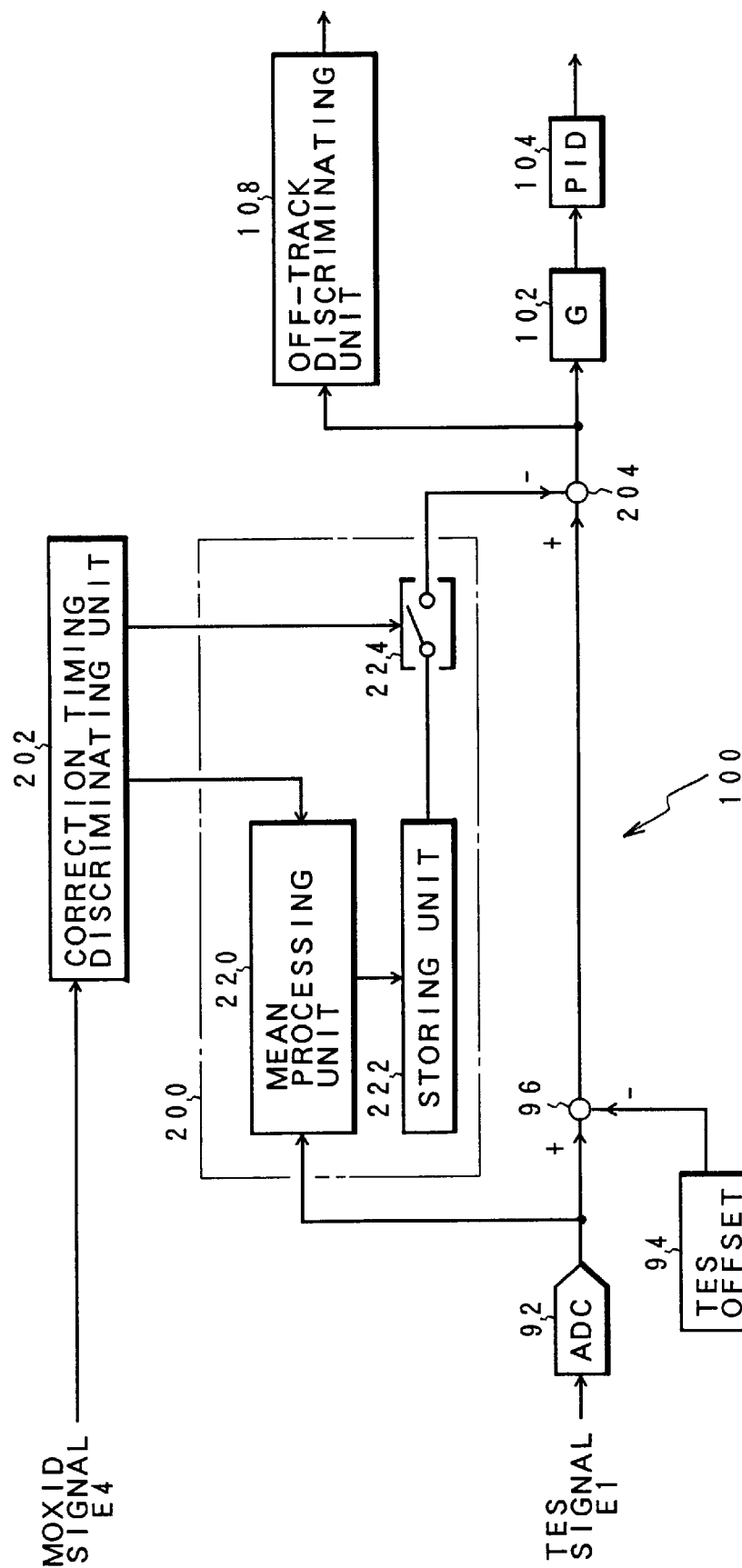
FIG. 13 is a functional block diagram of the third embodiment of the correction processing unit in FIGS. 3A and 3B in which a signal fluctuation of this time is corrected by a mean value of the previous signal fluctuation.

FIG. 13 is a functional block diagram of the third embodiment of the correction processing unit 100 of the invention provided in the on-track control unit 86 in FIGS. 3A and 3B. The third embodiment is characterized in that a mean value of the TES data in the signal fluctuation of the previous tracking error signal is used as a correction value and the signal fluctuation of this time is corrected. The correction processing unit 100 is constructed by the correction value calculating unit 200, correction timing discriminating unit 202, and adder 204 for correction. A mean processing unit 220, a storing unit 222, and a correction value output switch 224 are provided for the correction value calculating unit 200. When the trailing edge of the MOXID signal E4 is detected by the correction timing discriminating unit 202, the mean processing unit 220 calculates a mean value of the TES data which is obtained for a predetermined period of time, for example, four sampling periods 4T from the sampling start timing of the A/D converter 92 just after and stores the mean value into the storing unit 222. The mean value of the TES data of the signal fluctuation stored in the storing unit 222 is read out at a timing of the next signal fluctuation by the correction timing discriminating unit 202. The mean value is outputted as a correction value to the correcting adder 204 for a predetermined period of time, for example, for four sampling periods 4T by the correction value output switch 224, thereby correcting the TES data from the A/D converter 92 obtained at that time. At the first correction timing, since the mean value of the TES data derived at the previous correction timing is not stored in the storing unit 222, the TES data cannot be corrected. However, after the second time, it is possible to correct by using the mean value of the TES data obtained at the previous correction timing of the storing unit 222.

FIGS. 14A to 14E are time charts for the third embodiment in FIG. 13. FIG. 14A shows the tracking error signal E1 which is obtained during the on-track control. With respect to the signal fluctuation caused by the ID area, the portions of the two signal fluctuations 302-1 and 302-2 are extracted. The MOXID signal in FIG. 14B trails from the H level to the L level at each of time t1 and time t3 and the correction start timing is discriminated. The TES data by the A/D converter 92 in FIG. 14C is extracted with regard to the portions of the signal fluctuation 302-1 of the first time and the signal fluctuation 302-2 of the second time. In the signal fluctuation 302-1 of the first time, the TES data ". . . 2, 2, 1, −3, −4, −4, −4, −1, 1, 2, 3, 3 . . . " is obtained. In the signal fluctuation 302-2 of the second time, the TES data ". . . 3, 2, 0, −3, −4, −4, −3, 0, 2, 3, 4, 4 . . . " is obtained. FIG. 14D shows the correction value which is calculated by the mean processing unit 220 in FIG. 13. When the trailing edge of the MOXID signal E4 is detected at time t1, a mean value "−3" of four absolute values of the TES data "−3, −4, −4, −4" in four sampling periods 4T is calculated from time t2 serving as a first sampling start timing just after and is stored into the storing unit 222. In the signal fluctuation 302-1 of the first time, no correction value is stored in the storing unit 222 because it is the first time, so that the TES data of the A/D converter is not corrected but is used as it is. With regard to the next signal fluctuation 302-2 of the second time, the MOXID signal E4 trails to the L level at time t3 and when the correction start timing is discriminated, the mean value "−3" stored in the storing unit 222 at the previous correction timing is outputted as a correction value to the correcting adder 204 like a correction value of FIG. 14D for four sampling periods 4T from time t4 serving as a sampling start timing of the A/D converter 92 just after. The TES data "−3, −4, −4, −3" obtained at that time is corrected to correction TES data "0, −1, −1, 0" like a correction output value of FIG. 14E. The signal fluctuation 302-2 can be sufficiently reduced. Even at a correction timing from time t3, with respect to four TES data "−3, −4, −4, −3" obtained from time t4, the mean processing unit 220 calculates a mean value "3" of the absolute values and stores into the storing unit 222. The mean value calculated at this time is used as a correction value at the next correction timing. The above processes are similarly repeated after that. An on-track control process including the correcting process in the third embodiment of FIG. 13 is also substantially the same as the flowchart for the on-track control process in the first embodiment of FIG. 10 except for a different point that the calculating process of the correction value in step S3 has the processing contents of the correction value calculating unit 200 in FIG. 13.

(Correction by the previous fluctuated waveform)

Figure 15:
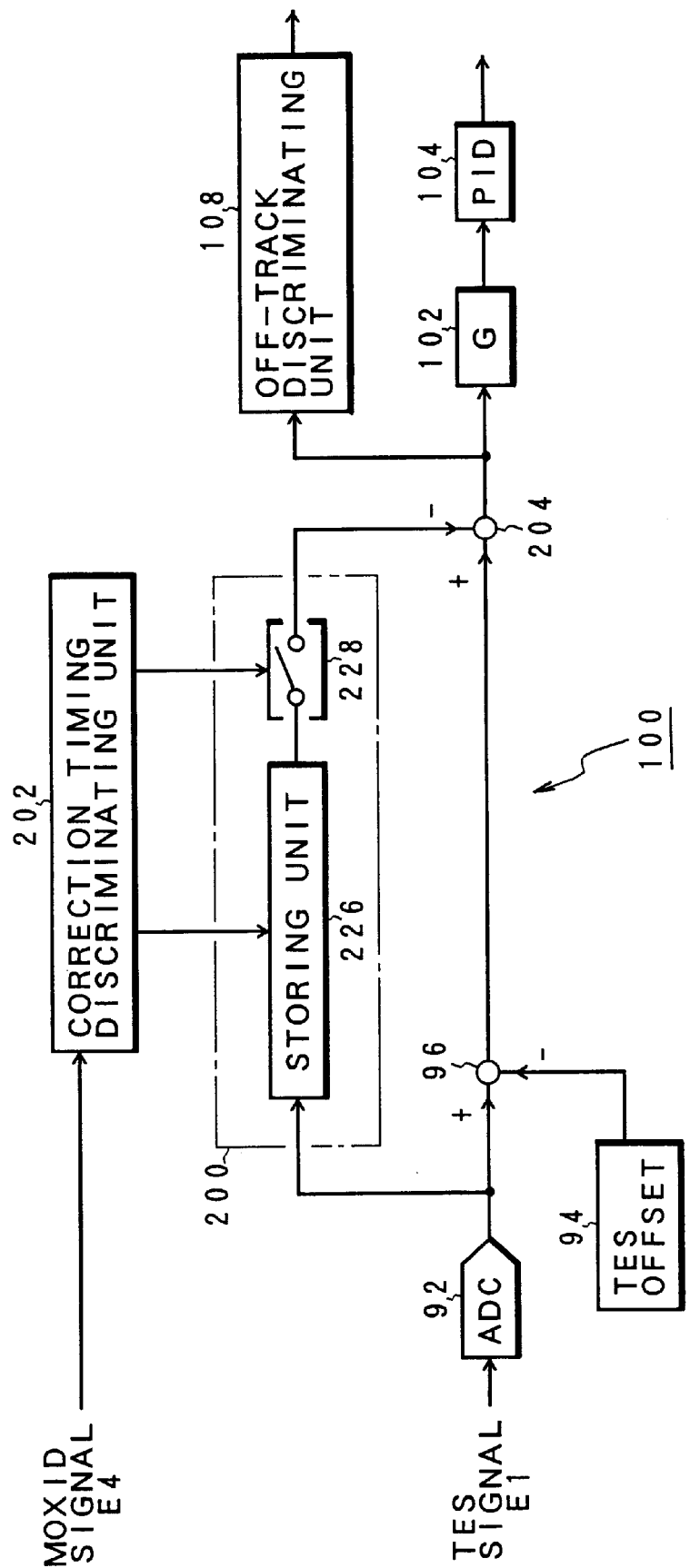
FIG. 15 is a functional block diagram of the fourth embodiment of the correction processing unit in FIGS. 3A and 3B in which a waveform of the previous signal fluctuation is stored and the signal fluctuation of this time is corrected.

FIG. 15 is a functional block diagram of the fourth embodiment of the correction processing unit 100 according to the invention provided for the on-track control unit 86 in FIGS. 3A and 3B. The embodiment is characterized in that the TES data (fluctuated waveform) obtained at the previous correction timing is stored as it is and is used as a correction value of the next correction timing. The correction processing unit 100 is constructed by the correction value calculating unit 200, correction timing discriminating unit 202, and correcting adder 204. A storing unit 226 and a correction value output switch 228 are provided for the correction value calculating unit 200. The storing unit 226 is a memory in which the reading and writing operations can be simultaneously performed at the same timing. The TES data which is obtained from the A/D converter 92 is stored at the correction timing and, at the same time, the TES data stored at the previous correction timing is read out and outputted as a correction value. The correction value output switch 228 is turned on for a correction period of time, for example, four sampling periods 4T and outputs the previous TES data read out from the storing unit 226 synchronously with the sampling period of the A/D converter 92 as a correction value to the correcting adder 204.

FIGS. 16A to 16E are time charts for the correcting process in the fourth embodiment of FIG. 15. FIG. 16A shows the tracking error signal E1 which is obtained during the on-tack control. The two signal fluctuations 302-1 and 302-2 which dropped in correspondence to the ID area are shown. FIG. 16B shows the MOXID signal E4 which trails from the H level to the L level at each of time t1 and time t3, thereby discriminating the correction start timing. FIG. 16C shows the TES data of the A/D converter 92 corresponding to the signal fluctuations 302-1 and 302-2 of two times of the tracking error signal E1. The TES data "2, 2, 1, −3, −4, −4, −4, −1, 1, 2, 3, 3" is derived in correspondence to the signal fluctuation 302-1 of the first time. The TES data ". . . 3, 2, 0, −3, −4, −4, −3, 0, 2, 3, 4, 4 . . . " is derived in correspondence to the signal fluctuation 302-2 of the second time. The storing unit 226 in FIG. 15 stores the TES data "−3, −4, −4, −4" which is obtained at four sampling periods 4T from the sampling start timing at time t2 subsequent to the trailing to the L level of the MOXID signal E4 at time t1 corresponding to the signal fluctuation 302-1 of the first time. Since there is no previous storage data at the first time, the correction is not performed. With respect to the signal fluctuation 302-2 of the second time, the MOXID signal E4 trails to the L level at time t3 and when the correction start timing is discriminated, the previous TES data stored in the storing unit 226 is outputted like a correction value "3, 4, 4, 4, 4" in FIG. 16D synchronously with four samples for four sampling periods 4T from the sampling start timing at time t3 just after. In the correcting adder 204, the previous correction value "−3, −4, −4, −4" which was stored and read out is subtracted from the TES data "−3, −4, −4, −3" obtained at that time, thereby correcting to the correction TES data "0, 0, 0, 1" like a correction output value in FIG. 16E. The signal fluctuation can be sufficiently reduced. An on-track control including the correcting process in the fourth embodiment of FIG. 15 is also substantially the same as the flowchart for the on-track control in the first embodiment of FIG. 10 except for a different point that the correction value stored in the storing unit 226 in FIG. 15 at the previous correction timing is read out and used for calculation of the correction value in step S3.

(Correction by the mean value of the fluctuated waveforms of a plurality of number of times)

Figure 17:
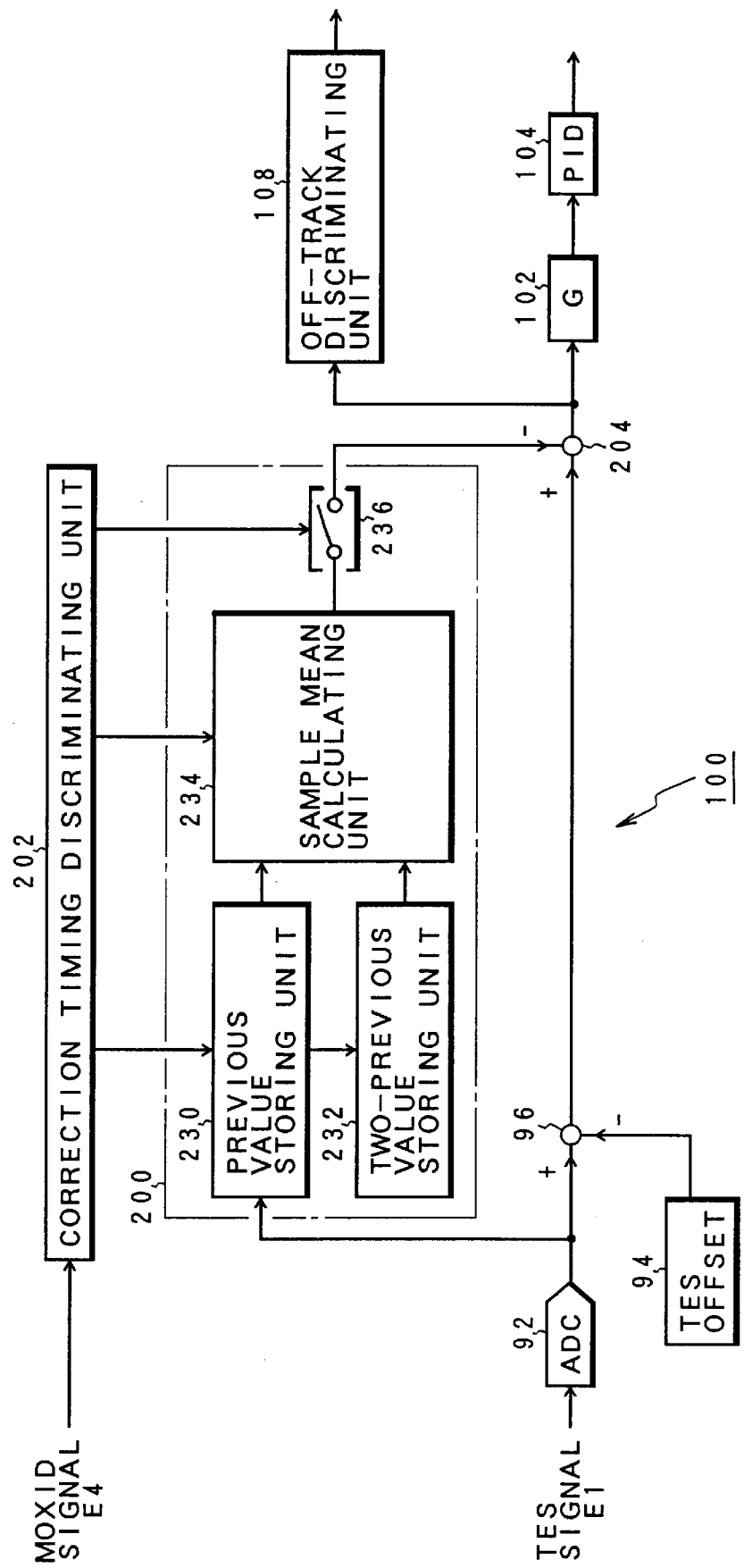
FIG. 17 is a functional block diagram of the fifth embodiment of the correction processing unit in FIGS. 3A and 3B in which the signal fluctuation of this time is corrected by a mean value of the storage values of the signal fluctuations of a plurality of times.

FIG. 17 shows the fifth embodiment of the correction processing unit 100 according to the invention provided for the on-track control unit 86 in FIGS. 3A and 3B. The embodiment is characterized in that a correction value at the same sampling position at the present correction timing is calculated by each mean value at the same sampling position of the TES data obtained at a plurality of past correction timings and the TES data is corrected. The correction processing unit 100 is constructed by the correction value calculating unit 200, correction timing discriminating unit 202, and adder 204 for correction. A previous value storing unit 230, a two-previous value storing unit 232, a sample mean calculating unit 234, and a correction value output switch 236 are provided for the correction value calculating unit 200. Four TES data obtained at the previous correction timings, for example, at four sampling periods 4T has been stored in the previous value storing unit 230. Four TES data obtained at the two-previous correction timing, for example, at the same four sampling periods 4T has been stored in the two-previous value storing unit 232. Specifically speaking, the TES data stored in the previous value storing unit 230 at each correction timing is shifted to the two-previous value storing unit 232 and, at the same time, a process for storing the TES data as many as four sampling periods 4T from the A/D converter 92 obtained at present into the previous value storing unit 230 is executed. The sample mean calculating unit 234 reads out the TES data at the same sampling position in the previous value storing unit 230 and the two-previous value storing unit 232 at every sampling period of the four sampling periods 4T at the correction timing and calculates a mean value. The sample mean value calculating unit 234 outputs the calculated mean value as a correction value to the correcting adder 204 through the correction value output switch 236 which is in the ON state at this time.

FIGS. 18A to 18E are time charts for the correcting process according to the fifth embodiment of FIG. 17. FIG. 18A relates to the tracking error signal E1 which is obtained during the on-track control and shows the portion of the signal fluctuation 302 which drops in correspondence to the ID area. The MOXID signal E3 in FIG. 18B trails from the H level to the L level at time t1 and the correction start timing is discriminated by detecting the trailing edge. The TES data derived by the A/D converter 92 in FIG. 18C changes to, for example, ". . . −2, −2, 1, 0, −1, −3, −4, −4, −3, 1, 2, 2 . . . ". A correction value in this case becomes correction TES data "−3, −3, −4, −3" as shown in FIG. 18D.

The correction TES data is calculated on the basis of TES data 310 at the previous correction timing shown on the left side and two-previous TES data 312. That is, the stored TES data at the previous correction timing is "−3, −4, −5, −4" and the two-previous stored TES data 312 is "−3, −3, −3, −2". Therefore, in the calculation of the correction value for correction of this time, mean data "−3" of the first sampling data "−3" and "−3" of the previous and two-previous TES data 310 and 312 is obtained. Subsequently, mean data "−3" of the second TES data "−4" and "−3" is obtained. Mean data "−4" of the third TES data "−5" and "−3" is obtained. Further, mean data "−3" of the fourth TES data "−4" and "−2" is obtained. The correction TES data "−3, −3, −4, −3" obtained as a mean value of the TES data at the same sampling position with respect to the TES data 310 and 312 at the previous and two-previous correction timings as mentioned above is corrected by subtracting the TES data "−3, −4, −4, −3" obtained at present, so that correction TES data "0, −1, 0, 0" shown in a correction output value in FIG. 18E is obtained. The correction in which the signal fluctuation 302 is sufficiently suppressed can be performed. As for the correction about the signal fluctuation corresponding to the ID area which is subsequently derived, as shown on the right side, the correction TES data shown on the right side in FIG. 18D is calculated from the mean value at the same sampling position of previous TES data 314 and two-previous TES data 316. The previous TES correction data 314 is the TES data "−3, −4, −4, −3" obtained at the correction timing at time t1. The two-previous TES data 316 is the TES data "−3, −4, −5, −4" used as previous TES data 310 shown on the left side at the correction timing at time t1. In a manner similar to the above, similar processes are repeated every correction timing.

FIGS. 19A and 19B are flowcharts for the on-track control process including the correcting process in the fifth embodiment of FIG. 17. First in step S1, the TES data is read out from the A/D converter 92. In step S2, the presence or absence of the leading edge of the MOXID signal is discriminated. When there is the trailing edge, step S3 follows. The previous and two-previous sampling values at the same position, namely, the TES data is averaged, thereby calculating a correction value. Subsequently, in step S4, the previous TES data is updated to the two-previous TES data and the TES data of this time is updated to the previous TES data. Processes in subsequent steps S5 to S12 are substantially the same as those in steps S4 to S11 in the flowchart of the first embodiment in FIG. 10.

(Discrimination of the optimum correction timing)

Figure 20:
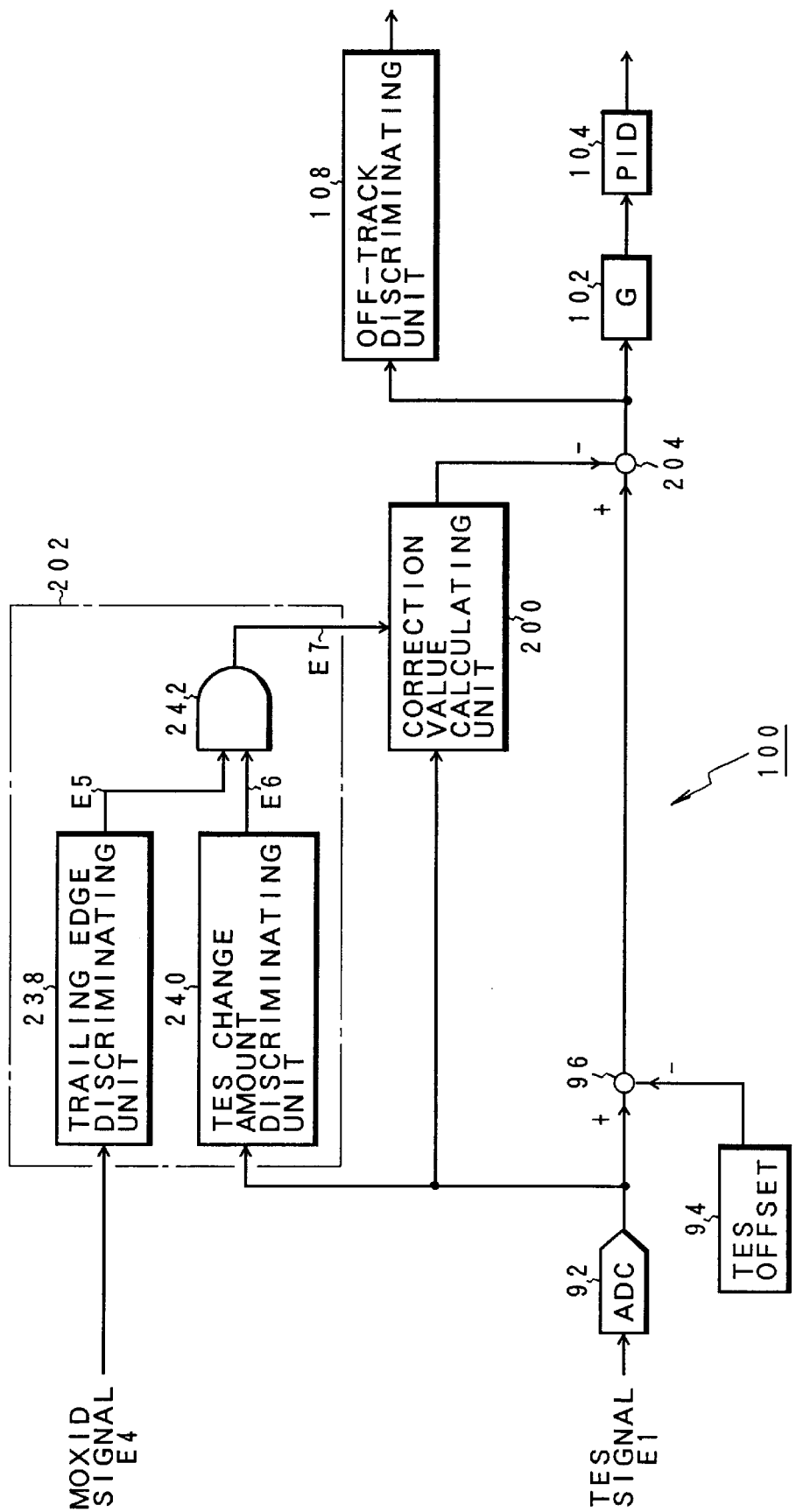
FIG. 20 is a functional block diagram of the sixth embodiment of the correction processing unit in FIGS. 3A and 3B in which an optimum correction timing is discriminated from a change amount between the MOXID signal and TES data.

FIG. 20 shows the seventh embodiment of the correction processing unit 100 according to the invention provided for the on-track control unit 86 in FIGS. 3A and 3B. The embodiment is characterized in that the optimum correction timing is discriminated on the basis of both of the detection of the trailing edge of the MOXID signal and the change amount of the tracking error signal at that time. The correction processing unit 100 is constructed by the correction value calculating unit 200, correction timing discriminating unit 202, and adder 204 for correction. A trailing edge discriminating unit 238, a TES change amount discriminating unit 240, and an AND circuit 242 are provided for the correction timing discriminating unit 202. The trailing edge discriminating unit 238 discriminates the trailing edge to the L level of the MOXID signal and outputs a discrimination signal E5 at the H level to the AND circuit 242. The TES change amount discriminating unit 240 outputs a change amount discrimination signal E6 to the AND circuit 242. The signal E6 is set to the H level when a change amount as a difference between the present TES data read by the A/D converter 92 and the previous TES data exceeds a predetermined value. When discrimination signals at the H level are obtained from both of the trailing edge discriminating unit 238 and TES change amount discriminating unit 240, the AND circuit 242 outputs a discrimination signal at the H level showing the optimum correction timing to the correction value calculating unit 200.

FIGS. 21A to 21F are time charts for the optimum correction timing discriminating process by the correction timing discriminating unit 202 in FIG. 20. FIG. 21A shows the tracking error signal E1 which is obtained during the on-track control and shows the dropped portion of the signal fluctuation 302 corresponding to the ID area on the medium track. The tracking error signal E1 becomes the TES data read by the A/D converter 92 as shown in FIG. 21B. FIG. 21C shows the MOXID signal E4. The MOXID signal E4 already trailed from the H level to the L level at time t1. As shown in FIG. 21D, the discrimination output E5 of the trailing edge discriminating unit 238 rises to the H level at the sampling start timing t2 in the A/D converter 92 just after time t1. The TES data in FIG. 21B after time t2 changes to "5, −1, −7, −8 . . . ". The TES change amount discriminating unit 240 in FIG. 20 obtains a difference "1, 6, 6, 1 . . . " between the TES data at the present sampling position and the TES data at the previous sampling position and compares it with a predetermined value, for example, a predetermined value "4". Therefore, a difference "6" when the TES data changes from "5" to "−1" at time t3 exceeds the predetermined value "4". The discrimination signal E6 from the TES change amount discriminating unit 240 rises to the H level as shown in FIG. 21D. Thus, as shown in FIG. 21F, the AND circuit 242 outputs a correction timing discrimination signal E7 at time t3 to the correction value calculating unit 200. A correction value is calculated by the correction value calculating unit 200 for, for example, four sampling periods 4T from time t3. The TES data from the A/D converter 92 is corrected in the correcting adder 204.

If the discriminating process by the TES change amount discriminating unit 240 in FIG. 20 is not performed, it is determined that the correction start timing has come at time t2 just after the detection of the trailing edge of the MOXID signal E4 at time t1 in FIGS. 21A to 21F. For example, in the correction value calculating unit 200 of the first embodiment in FIG. 8, a difference "1" between the TES data "5" at the correction start timing t2 and the previous TES data "6" is used as a correction value. A correction in which the correction value is subtracted from the TES data "5, −1, −7, −8" of 4T is performed. The correction TES data in this case becomes "4, 0, −6, −7" and the timing is too early, so that the signal fluctuation cannot be sufficiently corrected. On the other hand, according to the discrimination of the correction timing discriminating unit 202 in FIG. 20 in which the discrimination of the TES change amount is performed besides the discrimination of the trailing edge of the MOXID signal E4, time t3 in FIG. 20 is determined as a correction start timing. In this case, the correction value as a difference between the TES data before and after time t3 is equal to "6". The correction TES data for the four sampling periods 4T can be sufficiently corrected to "5, −1, −2, 0".

FIGS. 22A and 22B are flowcharts for the on-track control process including the correction timing discriminating process by the correction timing discriminating unit 202 in FIG. 20. First in step S1, the TES data is read out from the A/D converter 92. In step S2, a trailing edge of the MOXID signal E4 is discriminated. When the trailing edge is detected, step S3 follows and a change amount of the TES data is calculated. If the change amount is equal to or larger than a predetermined value in step S4, step S5 follows. This timing is decided as an optimum correction timing and a correction value is calculated. Processes in steps S5 to S13 are substantially the same as the processes in steps S3 to S11 in the on-track control process in FIG. 10.

(Compression of the signal fluctuation)

FIG. 23 is a functional block diagram of the seventh embodiment of the correction processing unit 100 according to the invention provided for the on-track control unit 86 in FIGS. 3A and 3B. The embodiment is characterized in that the gain which is multiplied to the TES data sampled by the A/D converter 92 is reduced at the correction timing of the signal fluctuation of the tracking error signal caused by the ID area, thereby decreasing an influence by the fluctuation signal. The correction processing unit 100 is constructed by the correction timing discriminating unit 202 and a gain change-over unit 244. In addition to the phase compensator 102 having a gain G provided subsequently to the correction processing unit 100 in FIGS. 3A and 3B, a change-over switch 246 and a phase compensator 248 in which a gain Gd lower than the gain G of the phase compensator 102 has been set are provided for the gain change-over unit 244. At a correction timing based on the detection of the trailing edge of the MOXID signal E4 by the correction timing discriminating unit 202, the change-over switch 246 is switched from the phase compensator 102 shown in the diagram to the phase compensator 248 side. Now, assuming that the gain G of the phase compensator 102 is set to G=1, the gain Gd of the phase compensator 248 which is switched at the correction timing is set to, for example, Gd=0.5.

Figure 24A:
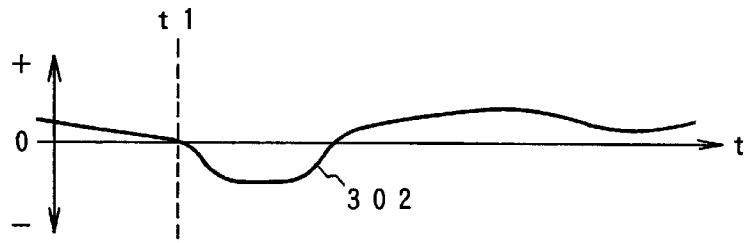
FIGS. 24A to 24E are time charts for the correcting process in FIG. 23.
Figure 24B:
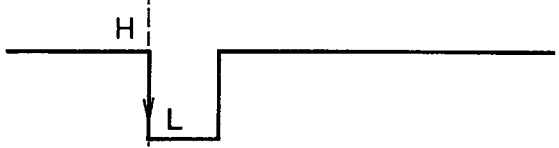
Figure 24C:
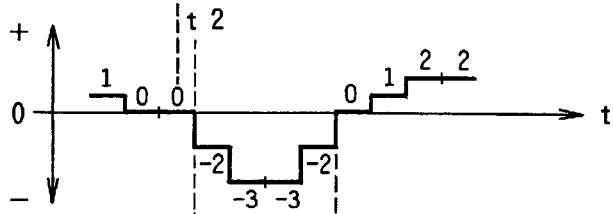
Figure 24D:
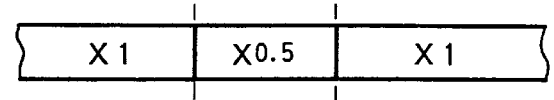
Figure 24E:
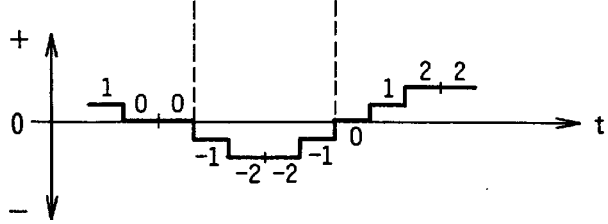

FIGS. 24A to 24E are time charts for the correcting process in the seventh embodiment in FIG. 23. FIG. 24A shows the tracking error signal E1 and shows the portion of the signal fluctuation 302 in which the signal drop occurred due to the ID area during the on-track control. As for the MOXID signal E4 in FIG. 24B, the trailing edge from the H level to the L level is detected at time t1 and the correction start timing is discriminated. FIG. 24C shows the read value of the TES data sampled by the A/D converter 92 and shows the portion of the signal fluctuation 302 of the tracking error signal E1 in FIG. 24A. The TES data changes to ". . . 1, 0, 0, −2, −3, −3, −2, 0, 1, 2, 2 . . . ". The correction timing discriminating unit 202 in FIG. 23 detects the trailing edge to the L level of the MOXID signal E4 at time t1. The change-over switch 246 is switched from the phase compensator 102 to the phase compensator 248 side at time t2 as a sampling start timing of the A/D converter 92 just after. This switching state is maintained, for example, for four sampling periods 4T from time t2. Therefore, the gain of the TES data from the A/D converter 92 which passes through the gain change-over unit 244 is equal to the gain G (=1) by the phase compensator 102 until time t2 as shown in FIG. 24D. However, it is switched to the gain Gd (=0.5) of the phase compensator 248 for four sampling periods 4T from time t2. Thus, the TES data "−2, −3, −3, −2" in four sampling periods 4T from time t2 passes through the phase compensator 248 and is compressed to "−1, −2, −2, −1" like a correction output value in FIG. 24D. The signal fluctuation 302 of the tracking error signal E1 can be reduced. Although FIG. 23 shows the example in the case where the gain Gd of the phase compensator 248 is set to Gd=0.5, the invention is not limited to it. For instance, it is also possible to set to Gd=0.25 and to further raise a degree of compression for the signal fluctuation.

Figure 25:
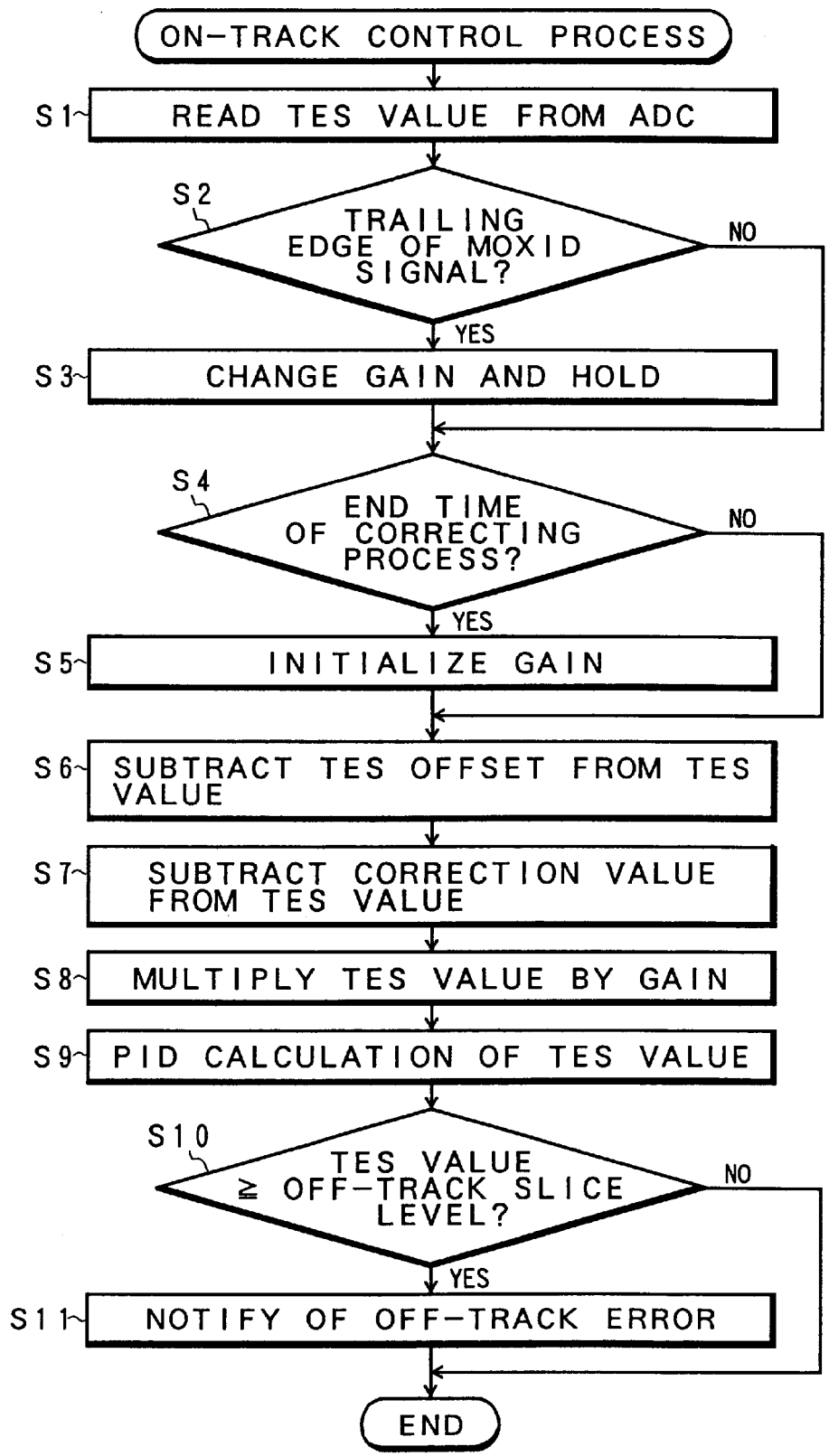
FIG. 25 is a flowchart for the correcting process in FIG. 23.

FIG. 25 is a flowchart for the on-track control process including the correcting process in the seventh embodiment of FIG. 23. First in step S1, the TES data is read out from the A/D converter 92. In step S2, the trailing edge of the MOXID signal E4 is checked. When the trailing edge is detected, step S3 follows. The gain is changed to a lower value and held, thereby compressing the TES data of the signal fluctuation. Processes in steps S4 to S11 are substantially the same as those in steps S4 to S11 in FIG. 10.

(Clipping of the signal fluctuation)

Figure 26:
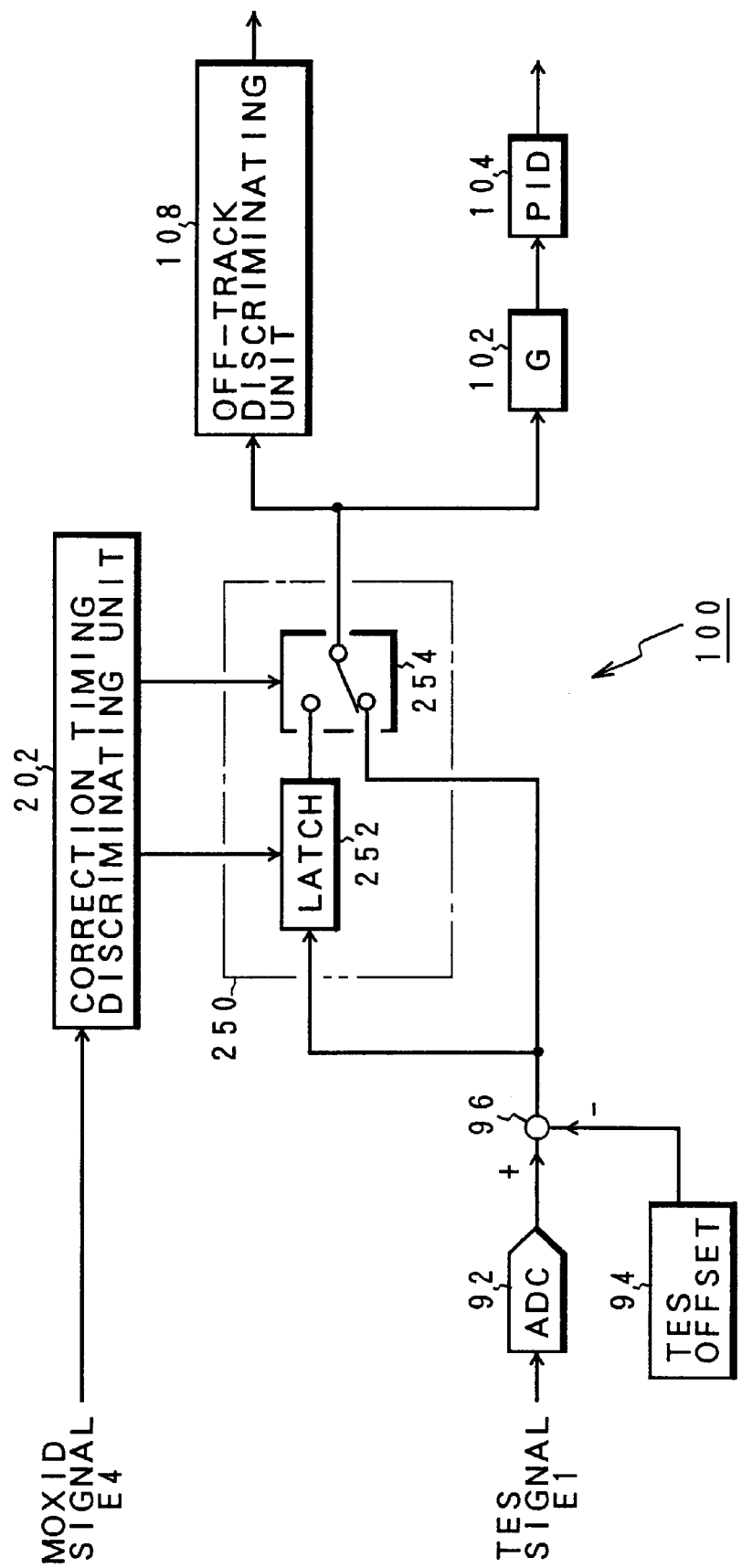
FIG. 26 is a functional block diagram of the eighth embodiment of the correction processing unit in FIGS. 3A and 3B in which the signal fluctuation is clipped by a TES data value just before.

FIG. 26 is a functional block diagram in the eighth embodiment of the correction processing unit 100 according to the invention provided for the on-track control unit 86 in FIGS. 3A and 3B. The embodiment is characterized in that the signal fluctuation of the tracking error signal caused by the ID area is clipped by using the TES data just before the occurrence of the signal fluctuation during the on-track control, thereby reducing the signal fluctuation. The correction processing unit 100 is constructed by the correction timing discriminating unit 202 and a clip processing unit 250. A latch 252 and a change-over switch 254 are provided for the clip processing unit 250. The correction timing discriminating unit 202 detects the trailing edge to the L level of the MOXID signal E4, outputs a control signal to the latch 252, and latches the TES data obtained from the A/D converter 92. The TES data latched in the latch 252 is the TES data just before the occurrence of the signal fluctuation. The correction timing discriminating unit 202 detects the trailing edge to the L level of the MOXID signal E4. The change-over switch 254 is switched from the output of the A/D converter 92 to an output of the latch 252 at the first sampling start timing of the A/D converter 92 after the TES data was latched into the latch 252. This switching state is maintained for, for example, four sampling periods 4T. Thus, for the correcting period of time during which the correction timing is discriminated by the correction timing discriminating unit 202, the TES data just before the signal fluctuation held in the latch 252 is outputted as correction TES data, so that it can be clipped to the TES data just before the signal fluctuation.

Figure 27A:
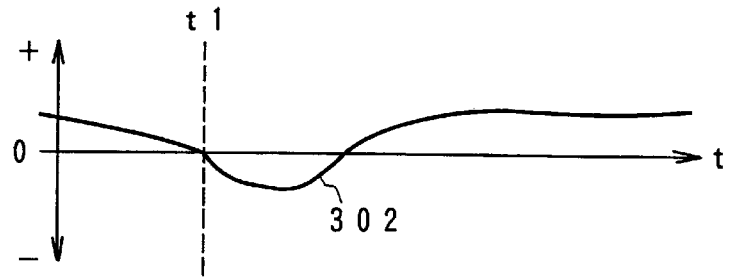
FIGS. 27A to 27E are time charts for the correcting process in FIG. 26.
Figure 27B:
Figure 27C:
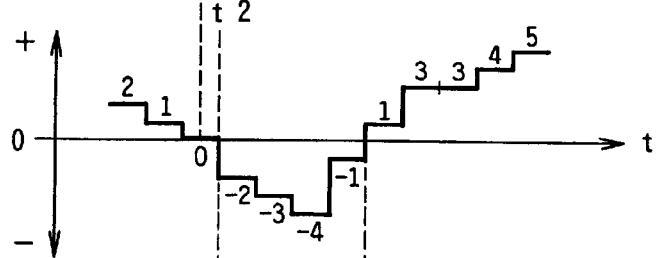
Figure 27D:
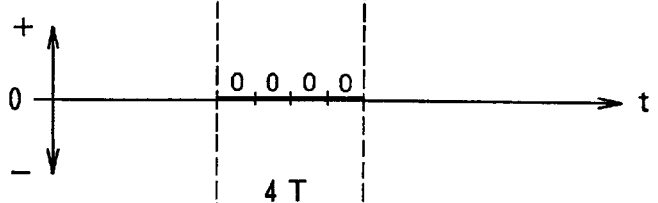
Figure 27E:
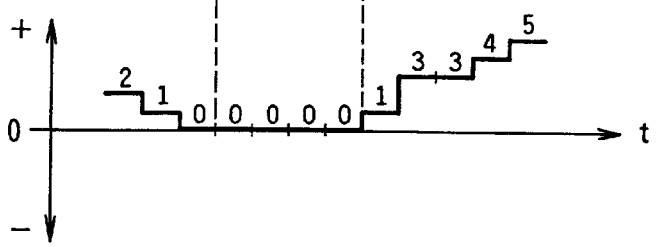

FIGS. 27A to 27E are time charts for the correcting process in FIG. 26. FIG. 27A shows the tracking error signal E1 which is obtained during the tracking control and shows the portion of the signal fluctuation 302 corresponding to the ID area. FIG. 27B shows the MOXID signal E4 which trails from the H level to the L level at time t1. In this instance, the correction timing discriminating unit 202 outputs a control signal to the latch 252, thereby latching the TES data. FIG. 27C shows the TES data sampled by the A/D converter 92 and shows the portion of the signal fluctuation 302 in the tracking error signal E1 in FIG. 27A. For example, the TES data changes to "2, 1, 0, −2, −3, −4, −1, 1, 3, 3, 4, 5". The TES data is latched into the latch 252 by the detection of the trailing edge of the MOXID signal E4 at time t1. The TES data which is latched is "0". The timing discriminating unit 202 switches the change-over switch 254 to the output side of the latch 252 at time t2 serving as a first sampling start timing after the TES data "0" was latched at time t1. This switching state is maintained for four sampling periods 4T from time t2. Therefore, the latch 252 outputs the TES data "0" latched at time t1 for four sampling periods 4T from time t2 as shown in FIG. 27D. Consequently, the TES data for the correcting period for four sampling periods 4T from time t2 is clipped from the TES data "−2, −3, −4, −1" to the correction TES data "0, 0, 0, 0" like a correction output value in FIG. 27E. The signal fluctuation 302 of the tracking error signal E1 can be reduced.

Figure 28:
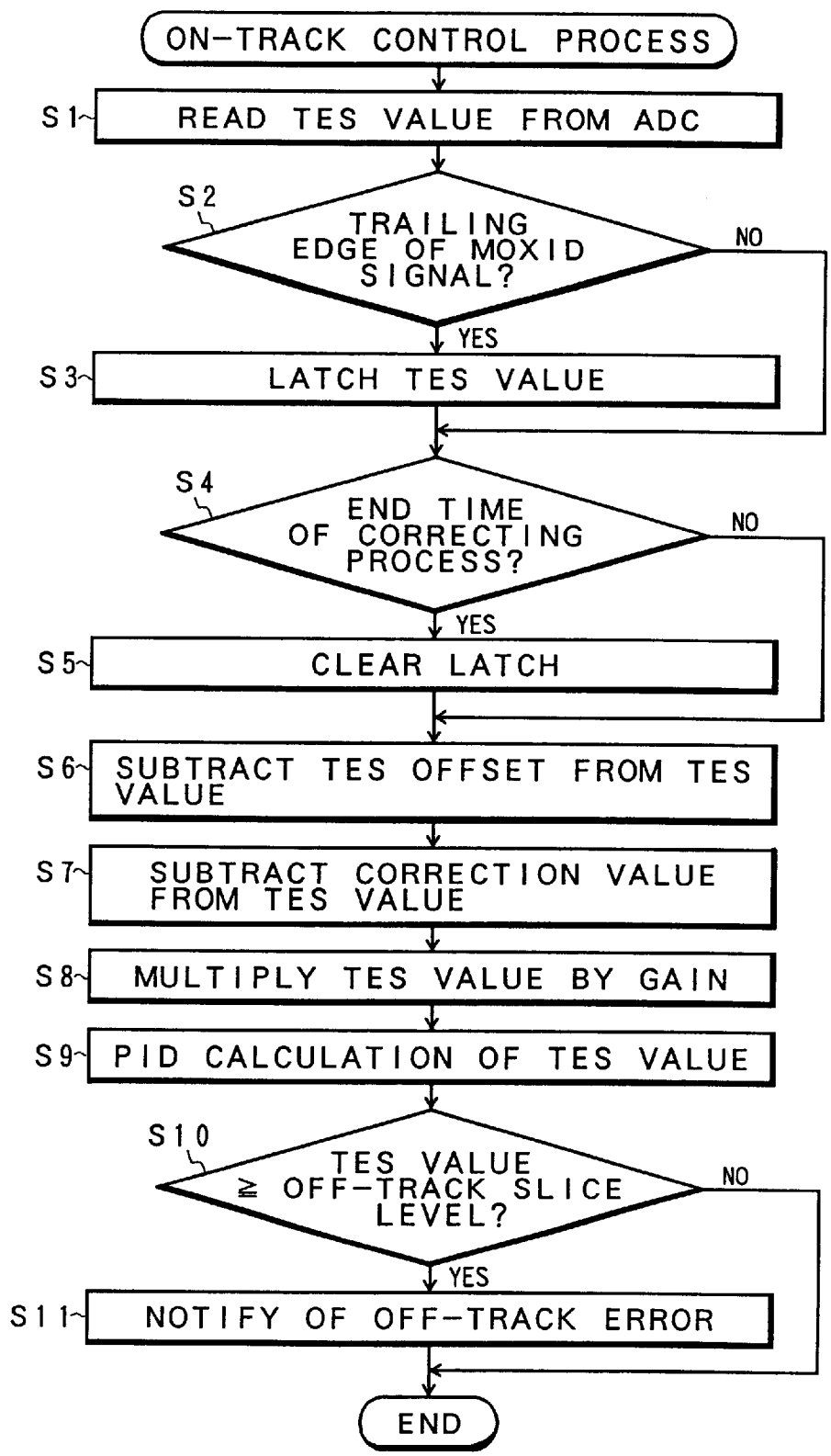
FIG. 28 is a flowchart for the correcting process in FIG. 26.

FIG. 28 is a flowchart for the on-track control process including the correcting process according to the eighth embodiment of FIG. 26. First in step S1, the TES data obtained by sampling by the A/D converter 92 is read. In step S2, the trailing edge of the MOXID signal is discriminated. When the trailing edge is detected, the TES data is latched and a clip value for correction is obtained in step S3. Processes in steps S4 to S11 are substantially the same as those in the first embodiment of FIG. 10. In the correction timing discriminating unit 202 in the seventh embodiment of FIG. 23 and the eighth embodiment of FIG. 26, the trailing edge from the H level to the L level of the MOXID signal E4 is discriminated. The sampling start timing of the A/D converter 92 just after is used as a correction start timing, and the correcting period of a predetermined period of time is set. However, like a correction timing discriminating unit 202 in the sixth embodiment of FIG. 20, it is also possible to discriminate the correction start timing by the AND between the discrimination signal showing the trailing edge of the MOXID signal E4 and the discrimination signal indicative of the change amount of the TES data.

According to the invention as described above, the timing of the level fluctuation appearing as a drop of the signal level in the tracking error signal when the laser beam passes through the ID area on the medium track is determined as a correction timing. With respect to the tracking error signal which is obtained at the correction timing, the correction to suppress the signal fluctuation caused by the ID area is performed and the influence by the signal fluctuation is reduced. Thus, a situation such that the on-track control becomes unstable by the fluctuation of the tracking error signal caused due to the ID area is certainly prevented. The stable on-track control can be realized.

With respect to the tracking error signal in which the signal fluctuation caused due to the ID area was corrected, by performing the off-track detection by comparing with the off-track/slice level, a situation such that the off-track is erroneously detected due to the signal fluctuation caused due to the ID area during the on-track control can be certainly prevented.

Although the above embodiment has been shown and described with respect to the apparatus having the lens actuator and the carriage actuator as an example, the invention can be also applied as it is to an on-track control of an apparatus in which the laser beam is moved by only the carriage actuator which does not have a lens actuator. Such an apparatus of the single actuator is obtained by excluding the driver 62, lens actuator 64, and lens position sensor 54 from the apparatus of FIGS. 1A and 1B.

The invention is not limited to the foregoing embodiments but incorporates many proper modifications without losing the objects and advantages of the present invention. The invention is not limited by the numerical values shown in the embodiments.

What is claimed is:

1. An optical storage apparatus comprising:
   an actuator for moving an objective lens to irradiate a laser beam onto a medium in a direction traversing tracks on said medium;
   a tracking error signal forming unit for forming a tracking error signal according to a position of said laser beam in the direction traversing the tracks on the basis of a photosensitive output of medium return light;
   a seek control unit for moving the laser beam to a target track by a control of said actuator;
   an on-track control unit for allowing the laser beam to trace the target track by the control of said actuator based on said tracking error signal; and
   a correction processing unit for discriminating an interval in which a signal fluctuation appears on said tracking error signal when the laser beam passes an ID area on the medium track during an on-track control and for correcting the tracking error signal so as to reduce the signal fluctuation in said discrimination interval.

2. An apparatus according to claim 1, wherein said correction processing unit comprises:
   a correction timing discriminating unit for discriminating the interval in which the signal fluctuation caused by said ID area on said medium track appears on said tracking error signal as a correction timing;
   a correction value determining unit for determining a correction value which is used for the correction of said tracking error signal; and
   a correcting unit for correcting a signal value obtained by sampling and converting the tracking error signal into a digital signal by an A/D converter at predetermined periods and reading by using the correction value determined by said correction value determining unit at the correction timing decided by said correction timing discriminating unit.

3. An apparatus according to claim 2, wherein said correction value determining unit obtains a difference between a signal value sampled for the first time by said A/D converter after a correction start timing and a signal value sampled by said A/D converter before said first sampling and determines said difference as a correction value, and
said correcting unit corrects by subtracting said correction value from each of signal values as many as predetermined sampling periods including the signal value sampled for the first time by said A/D converter after said correction start timing.

4. An apparatus according to claim 2, wherein said correction value determining unit obtains a difference between a signal value which was sampled for the first time by said A/D converter after a correction start timing and a predetermined target value and determines said difference as a correction value, and
said correcting unit corrects by subtracting said correction value from each of signal values as many as predetermined sampling periods including the signal value sampled for the first time by said A/D converter after said correction start timing.

5. An apparatus according to claim 2, wherein said correction value determining unit calculates a mean value of signal values sampled by said A/D converter for predetermined sampling periods from a correction start timing every correction timing and determines said mean value as a correction value, and
said correcting unit corrects by subtracting said correction value calculated at a previous correction timing from each of signal values as many as said predetermined sampling periods including the signal value sampled for the first time by said A/D converter after said correction start timing.

6. An apparatus according to claim 2, wherein said correction value determining unit stores signal values sampled by said A/D converter for predetermined sampling periods from a correction start timing every correction timing as correction values, and
said correcting unit corrects by reading out said signal value stored at a previous correction timing and subtracting said signal value from each of the signal values as many as said predetermined sampling periods including the signal value sampled for the first time by said A/D converter after the correction start timing.

7. An apparatus according to claim 2, wherein
said correction value determining unit stores a plurality of signal values read out from said A/D converter for predetermined sampling periods from a correction start timing every correction timing, calculates a mean value of the stored signal values at a same sampling position as many as a predetermined number of times, and determines said mean value as a correction value, and
said correcting unit corrects by subtracting said mean value at the same sampling position determined by said correction value determining unit from each of the signal values as many as said predetermined sampling periods including the signal value sampled for the first time by said A/D converter after the correction start timing.

8. An apparatus according to claim 7, wherein said correction value determining unit calculates a mean value of signal values at the same sampling position as many as a predetermined number of times stored at a previous period and a two-previous period every correction timing and determines said mean value as a correction value.

9. An apparatus according to claim 2, wherein
after a start position of said ID area on said medium track was detected, when a drop change in which the signal value sampled by said A/D converter exceeds a predetermined value is detected, said correction timing discriminating unit determines this timing as a correction start timing.

10. An apparatus according to claim 2, wherein said correction timing discriminating unit discriminates the correction timing on the basis of an MOXID signal which was detected from the return light of the laser beam to said medium track and whose signal level is inverted in an MO area and the ID area.

11. An apparatus according to claim 1, wherein said correction processing unit comprises:

a correction timing discriminating unit for discriminating a correction timing when the signal fluctuation caused due to the ID area on said medium track appears on said tracking error signal; and a gain change-over unit for switching an amplification gain of the signal value obtained by sampling and converting said tracking error signal into a digital signal by an A/D converter at predetermined periods and reading to a lower gain at the correction timing detected by said correction timing discriminating unit, thereby suppressing a change in said signal value.

12. An apparatus according to claim 1, wherein said correction processing unit comprises:

a correction timing discriminating unit for discriminating a correction timing when the signal fluctuation caused by said ID area on said medium track appears on said tracking error signal; and a clip processing unit for clipping a signal value obtained by sampling and converting said tracking error signal into a digital signal by an A/D converter at predetermined periods and reading to a signal value just before said correction timing.

13. An apparatus according to claim 1, further comprising an off-track detecting unit for comparing the tracking error signal corrected by said correction processing unit with a predetermined off-track slice value and notifying of an off-track error when the tracking error signal exceeds said predetermined off-track slice value.

* * * * *